US010982976B2

(12) United States Patent
Albrecht et al.

(10) Patent No.: US 10,982,976 B2
(45) Date of Patent: Apr. 20, 2021

(54) PLUG GAUGE AND ASSOCIATED SYSTEM AND METHOD FOR TAKING MULTIPLE SIMULTANEOUS DIAMETRIC MEASUREMENTS

(71) Applicant: The Boeing Company, Chicago, IL (US)

(72) Inventors: Mark Albrecht, Lake Stevens, WA (US); Kwok Tung Chan, Seattle, WA (US); Tanni Sisco, Seattle, WA (US); Everette D. Gray, Seattle, WA (US)

(73) Assignee: The Boeing Company, Chicago, IL (US)

( * ) Notice: Subject to any disclaimer, the term of this patent is extended or adjusted under 35 U.S.C. 154(b) by 297 days.

(21) Appl. No.: 16/287,142

(22) Filed: Feb. 27, 2019

(65) Prior Publication Data

US 2020/0271481 A1 Aug. 27, 2020

(51) Int. Cl.
*G01D 5/22* (2006.01)
*G01D 5/347* (2006.01)

(52) U.S. Cl.
CPC ....... *G01D 5/2291* (2013.01); *G01D 5/34746* (2013.01)

(58) Field of Classification Search
CPC .... G01D 5/2291; G01D 5/34746; G01B 3/46; G01B 5/12; G01B 7/13; G01B 7/287; G01B 3/26; G01B 21/14; G01B 11/12

(Continued)

(56) References Cited

U.S. PATENT DOCUMENTS 4,170,831 A 10/1979 Olasz
9,556,682 B2 * 1/2017 Fuller ................. E21B 7/28
(Continued)

FOREIGN PATENT DOCUMENTS

EP 0 699 294 3/1996
EP 3 037 193 6/2016
(Continued)

OTHER PUBLICATIONS

Capacitec, "Non-contact Capacitive Hole Diameter Sensor Probes," https://www.capacitec.com/Products/Hole-Measuring-Systems/Hole-Diameter-Probes (2019).
(Continued)

*Primary Examiner* — Yaritza Guadalupe-McCall
(74) *Attorney, Agent, or Firm* — Walters & Wasylyna LLC

(57) ABSTRACT

A plug gauge includes a housing, defining an internal volume, first openings, and second openings. The plug gauge includes first contact elements, each at least partially received in a respective one of the first openings. The plug gauge includes a first plunger in the internal volume and movable relative to the housing. The first plunger is biased to urge the first contact elements radially outward through the first openings. The plug gauge includes a first sensor sensing movement of the first plunger. The plug gauge includes second contact elements, each at least partially received in a respective one of the second openings. The plug gauge includes a second plunger in the internal volume and movable relative to the housing. The second plunger is biased to urge the second contact elements radially outward through the second openings. The plug gauge includes a second sensor sensing movement of the second plunger.

30 Claims, 18 Drawing Sheets

(58) Field of Classification Search
USPC .......................................................... 33/544.5
See application file for complete search history.

(56) References Cited

U.S. PATENT DOCUMENTS

| | | | |
|---|---|---|---|
| 10,323,474 B2* | 6/2019 | Olsen | E21B 34/04 |
| 2014/0090888 A1* | 4/2014 | Smith | E21B 34/02 |
| | | | 175/38 |
| 2019/0032471 A1* | 1/2019 | Puls | E21B 43/127 |
| 2020/0271481 A1* | 8/2020 | Albrecht | G01B 7/287 |
| 2020/0284571 A1* | 9/2020 | Albrecht | G01B 3/26 |
| 2020/0333126 A1* | 10/2020 | Albrecht | G01B 5/12 |

FOREIGN PATENT DOCUMENTS

| | | |
|---|---|---|
| GB | 1 556 458 | 11/1979 |
| WO | WO 2010/060974 | 6/2010 |

OTHER PUBLICATIONS

Willrich Precision Instrument, "Mahr Federal Dimentron Plug," https://willrich.com/ (2019).
Diatest, "BMD—Plug Gauge," http:www.diatest.com/products/solutions-for-gauging/measurement-of-diameter-and-length (2019).
European Patent Office, Extended European Search Report, App. No. 20159269.8 (Jul. 15, 2020).

* cited by examiner

PLUG GAUGE AND ASSOCIATED SYSTEM AND METHOD FOR TAKING MULTIPLE SIMULTANEOUS DIAMETRIC MEASUREMENTS

FIELD

This application relates to bore metrology and, more particularly, to plug gauges and associated systems and methods for taking multiple simultaneous diametric measurements of a bore.

BACKGROUND

There are a variety of measuring tools used for determining the diameter of a cylindrical bore. Measuring tools of this type normally include a device that functions by contacting diametrically opposite points within the bore. Examples of measuring tools of this type include a caliper, a combination of a caliper with a dial indicator, a tubular inside micrometer, and a plug gauge or comparator. While being satisfactory for some uses, traditional measuring tools suffer from certain drawbacks. Some measuring tools are incapable of taking measurement deep within a bore. Other measuring tools often cannot be maintained in a proper position to enable accurate measurements. Other measuring tools do not fulfill tolerance requirements for specific applications. Still other measuring tools are incapable of collecting sufficient data to fully characterize the dimensions of the bore. These difficulties are often magnified when a number of different measurements are required, for example, to determine if the bore is tapered, eroded, damaged, or uneven in some other manner. Gathering a sufficient number of measurements often adds undesired time to production. Accordingly, those skilled in the art continue with research and development efforts in the field of internal bore measuring devices and, as such, apparatuses and methods, intended to address the above-identified concerns, would find utility.

SUMMARY

The following is a non-exhaustive list of examples, which may or may not be claimed, of the subject matter according to the present disclosure.

In an example, a disclosed plug gauge includes a housing defining an internal volume and a longitudinal axis $A_H$. The housing includes a plurality of first openings into the internal volume and a plurality of second openings into the internal volume. The plug gauge also includes a plurality of first contact elements. Each first contact element of the plurality of first contact elements is at least partially received in a respective one of the plurality of first openings in the housing. The plug gauge further includes a first plunger received in the internal volume of the housing and defining a first plunger axis $A_{P1}$ that is aligned with the longitudinal axis $A_H$ of the housing. The first plunger is movable relative to the housing along the first plunger axis $A_{P1}$. The first plunger is biased into engagement with the plurality of first contact elements to urge the plurality of first contact elements radially outward through the plurality of first openings. The plug gauge additionally includes a first sensor sensing movement of the first plunger relative to the housing. The plug gauge also includes a plurality of second contact elements. Each second contact element of the plurality of second contact elements is at least partially received in a respective one of the plurality of second openings in the housing. The plug gauge further includes a second plunger received in the internal volume of the housing and defining a second plunger axis $A_{P2}$ that is aligned with the longitudinal axis $A_H$ of the housing 100. The second plunger is movable relative to the housing along the second plunger axis $A_{P2}$. The second plunger is biased into engagement with the plurality of second contact elements to urge the plurality of second contact elements radially outward through the plurality of second openings. The plug gauge additionally includes a second sensor sensing movement of the second plunger relative to the housing.

In an example, a disclosed plug gauge includes a housing defining an internal volume and a longitudinal axis $A_H$. The housing includes a pair of first openings into the internal volume and a pair of second openings into the internal volume. The pair of second openings are displaced a predefined non-zero distance D along the longitudinal axis $A_H$ from the pair of first openings. The plug gauge also includes a pair of first contact elements aligned along a first contact element axis $A_{C1}$ that is generally perpendicular to the longitudinal axis $A_H$. Each first contact element of the pair of first contact elements is received in an associated one of the pair of first openings. The plug gauge further includes a first plunger received in the internal volume of the housing and defining a first plunger axis $A_{P1}$ that is aligned with the longitudinal axis $A_H$ of the housing. The first plunger is movable relative to the housing along the first plunger axis $A_{P1}$. The first plunger is biased into engagement with the pair of first contact elements. The plug gauge additionally includes a first sensor received in the internal volume of the housing to sense movement of the first plunger relative to the housing. The plug gauge also includes a pair of second contact elements aligned along a second contact element axis $A_{C2}$ that is generally perpendicular to the longitudinal axis $A_H$ and disposed at a non-zero angle Θ relative to the first contact element axis $A_{C1}$. Each second contact element of the pair of second contact elements is received in an associated one of the pair of second openings. The plug gauge further includes a second plunger received in the internal volume of the housing and defining a second plunger axis $A_{P2}$ that is aligned with the longitudinal axis $A_H$ of the housing. The second plunger is movable relative to the housing along the second plunger axis $A_{P2}$. The second plunger is biased into engagement with the pair of second contact elements. The plug gauge additionally includes a second sensor sensing movement of the second plunger relative to the housing.

In an example, a disclosed system for taking multiple simultaneous diametric measurements of a bore formed in a structure includes a plug gauge, sized to be received in the bore, and a support connected to the plug gauge.

In an example, a disclosed method for taking multiple simultaneous diametric measurements of a bore formed in a structure includes steps of: (1) inserting a plug gauge into the bore while the plug gauge is at a first orientation with respect to the longitudinal axis $A_H$; (2) rotating the plug gauge about the longitudinal axis $A_H$ to a second orientation with respect to the longitudinal axis $A_H$; and (3) withdrawing the plug gauge from the bore.

Other examples of the disclosed plug gauge, system, and method will become apparent from the following detailed description, the accompanying drawings and the appended claims.

DETAILED DESCRIPTION

Figure 1:
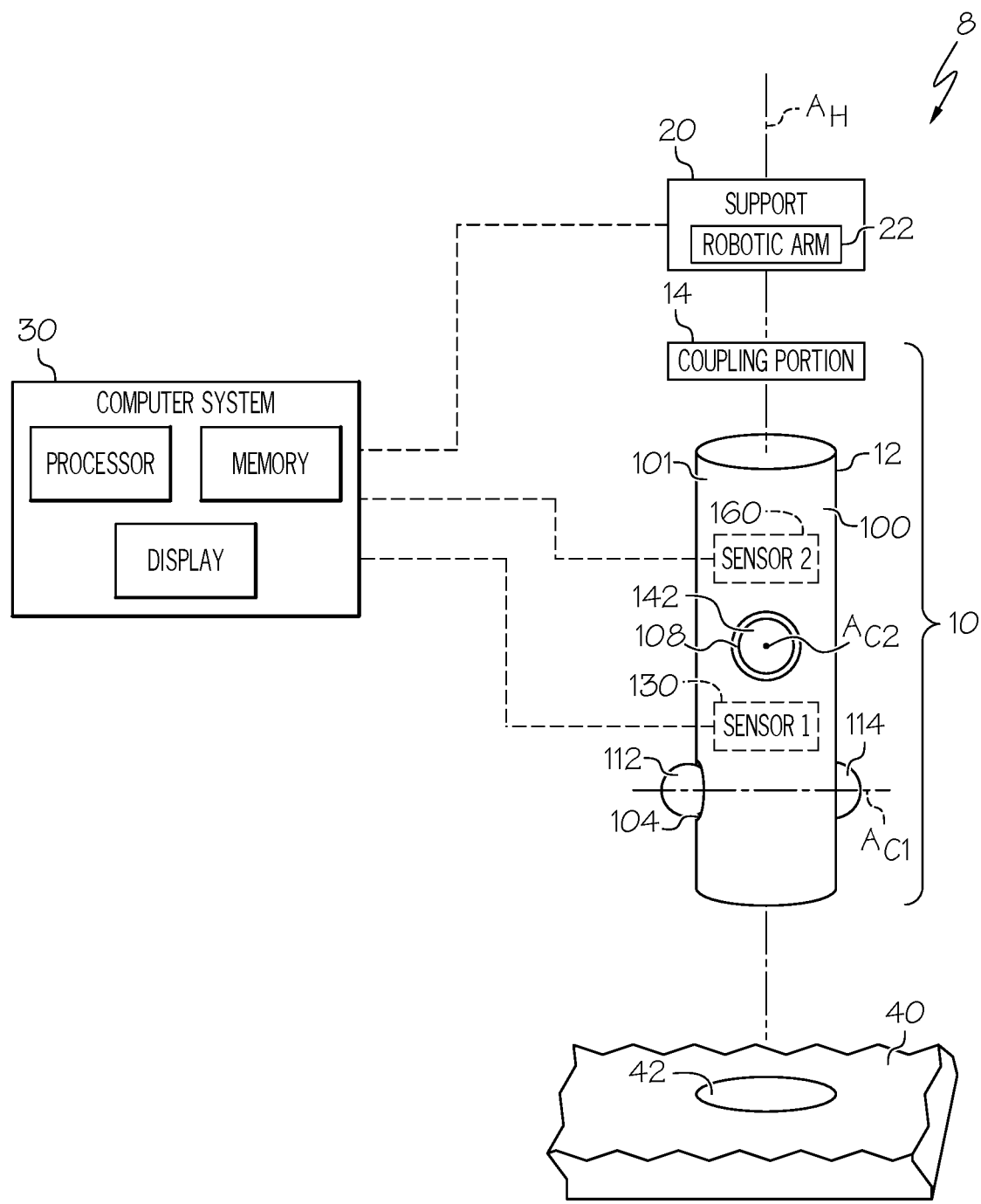
FIG. 1 depicts one example of the disclosed plug gauge and associated system for taking multiple simultaneous diametric measurements.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Referring to FIGS. 1-17, examples of a plug gauge 10 are disclosed. The plug gauge 10 is configured to be used to take multiple simultaneous diametric measurements of a bore 42 formed in a structure 40, as illustrated in FIGS. 1, 4, and 5. The structure 40 may include, or take the form of, any solid body having any shape and dimensions, depending on the particular purpose of the structure 40. The structure 40 may be made of any one of various suitable materials, such as a metallic material, a plastic material, a composite material, and the like. The structure 40 may be monolithic (a single piece of continuous material) or may be a consolidated laminate of a plurality of material layers. The bore 42 may extend through a portion of or an entirety of a through thickness of the structure 40. The bore 42 may be formed in the structure 40 by any one of various feature-forming techniques, such as machining (e.g., drilling or boring), other subtractive manufacturing operations, or during formation such as during an additive manufacturing process.

As illustrated in FIG. 4, the bore 42 has a number of bore-dimensions BD. As used herein, "a number of" identified items refers to one or more of those identified items. The bore-dimension BD is defined by a linear distance between two diametrically opposed points on an interior surface defining the bore 42. In some circumstances, the bore-dimensions BD may be constant along a longitudinal-central axis of the bore 42, such as for a cylindrical bore. In some circumstances, the bore-dimensions BD may vary along the longitudinal-central axis of the bore 42, such as for a tapered, worn, or damaged bore. In some circumstances, the bore dimensions BD may be constant at a given location along longitudinal-central axis of the bore 42, such as for a bore having a circular cross-section, viewed along the longitudinal-central axis. In some circumstances, the bore dimensions BD may vary at a given location along longitudinal-central axis of the bore 42, such as for a bore having an ovular or elliptical cross-section, viewed along the longitudinal-central axis.

Referring to FIGS. 1-9, 11-14, and 16, in one or more examples, the plug gauge includes a housing 100. The housing 100 defines an internal volume 102 (FIGS. 2-4) and has a longitudinal axis $A_H$. The housing 100 includes a plurality of first openings 104, 106 (FIG. 2) into the internal volume 102. The housing 100 includes a plurality of second openings 108, 110 (FIG. 3) into the internal volume 102.

As illustrated in FIGS. 1, 4, and 5, the housing 100 is configured to be inserted at least partially within the bore 42 formed in the structure 40 for the purpose of taking multiple simultaneous diametric measurements of the bore 42 using the plug gauge 10. As illustrated in FIGS. 2-4, 6-9, 11-14, and 16, the housing 100 internally houses and protects at least a portion of the various operating components of the plug gauge 10 within the internal volume 102. As illustrated in FIGS. 4 and 5, the housing 100 has external dimensions approximating, but being less than, the bore-dimensions BD of the bore 42 so that the housing 100 freely fits within the bore 42.

As illustrated in FIGS. 1-9, 11-14, and 16, in one or more examples, the plug gauge 10 includes a plurality of first contact elements 112, 114. Each first contact element 112, 114 of the plurality of first contact elements 112, 114 is at least partially received in a respective one of the plurality of first openings 104, 106 in the housing 100.

Figure 2:
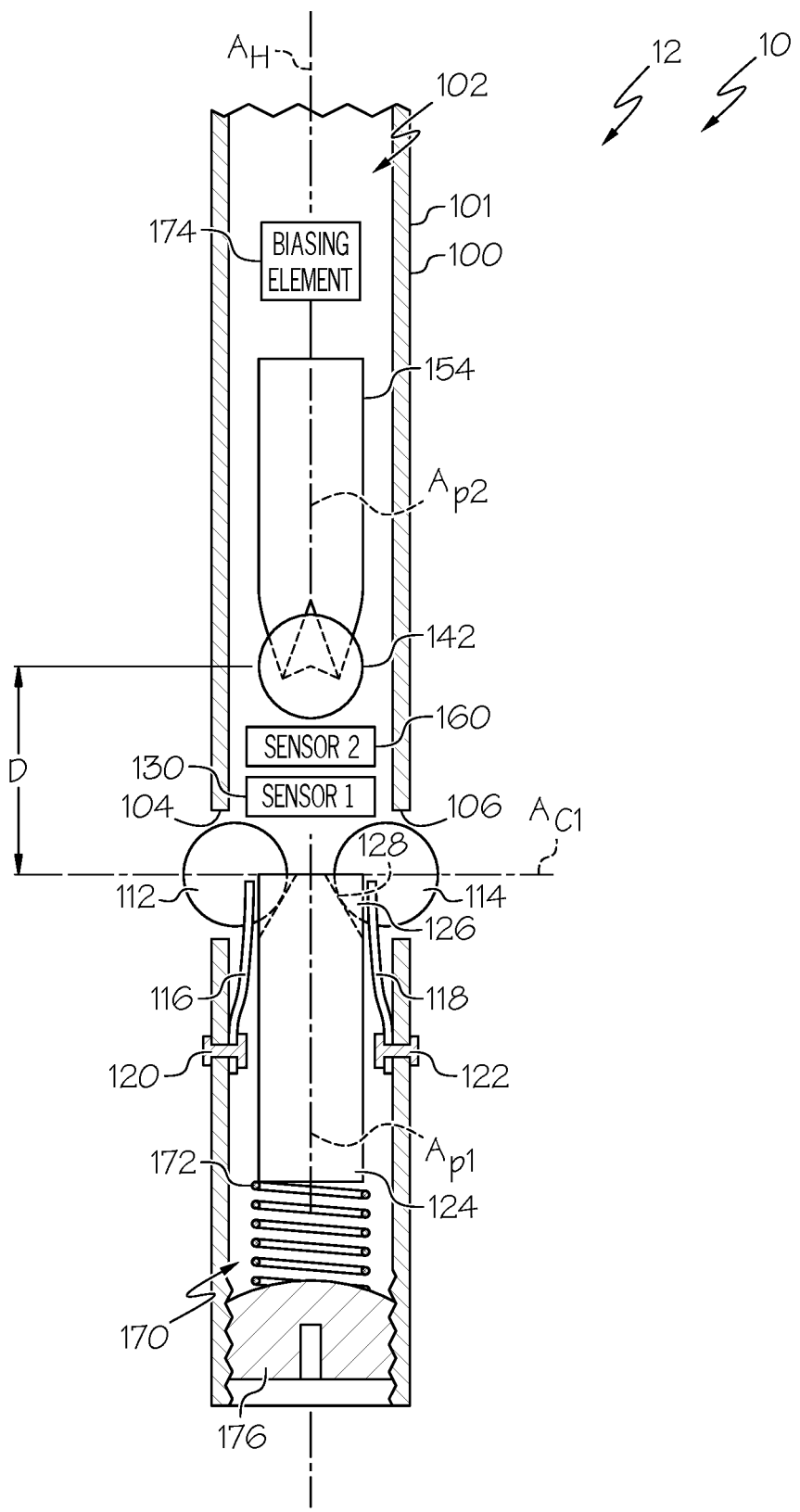
FIG. 2 is an elevational view, in cross-section, of the probe portion of the plug gauge shown in FIG. 1.

As illustrated in FIGS. 4 and 5, the plurality of first contact elements 112, 114 are configured to engage the interior surface defining the bore 42 when the housing 100 is inserted within the bore 42. Each first contact element 112, 114 of the plurality of first contact elements 112, 114 is moveable within the respective one of the plurality of first openings 104, 106 relative to the housing 100. As illustrated in FIG. 2, first contact element 112 is at least partially received in and is moveable within first opening 104 and first contact element 114 is at least partially received in and is moveable within first opening 106.

Figure 3:
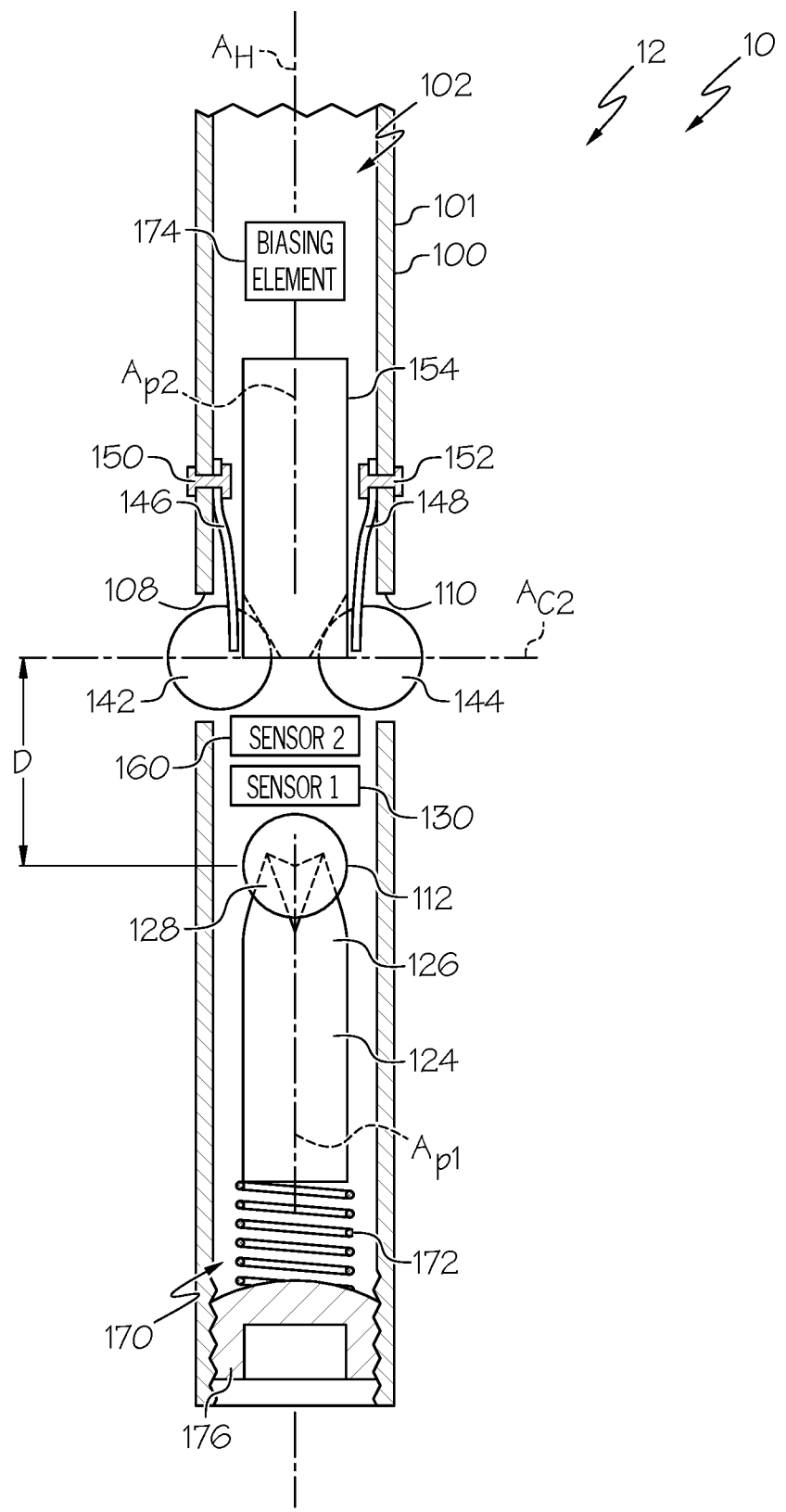
FIG. 3 is an elevational view, in cross-section, of the probe portion of FIG. 2 shown rotated ninety degrees from the orientation shown in FIG. 2.
Figure 4:
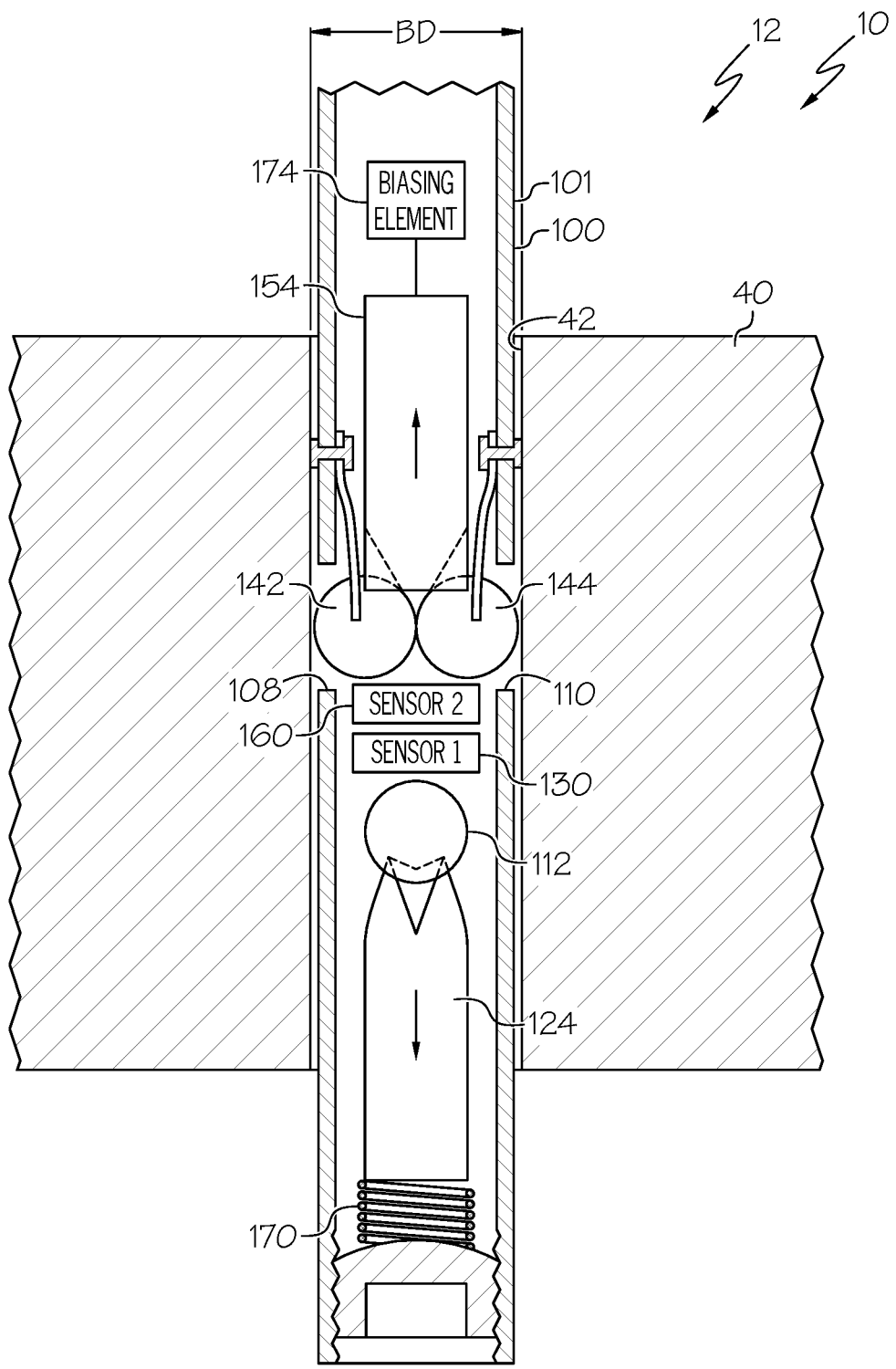
FIG. 4 is an elevational view, in cross-section, depicting the probe portion of FIG. 3 inserted into a bore formed in a structure.
Figure 5:
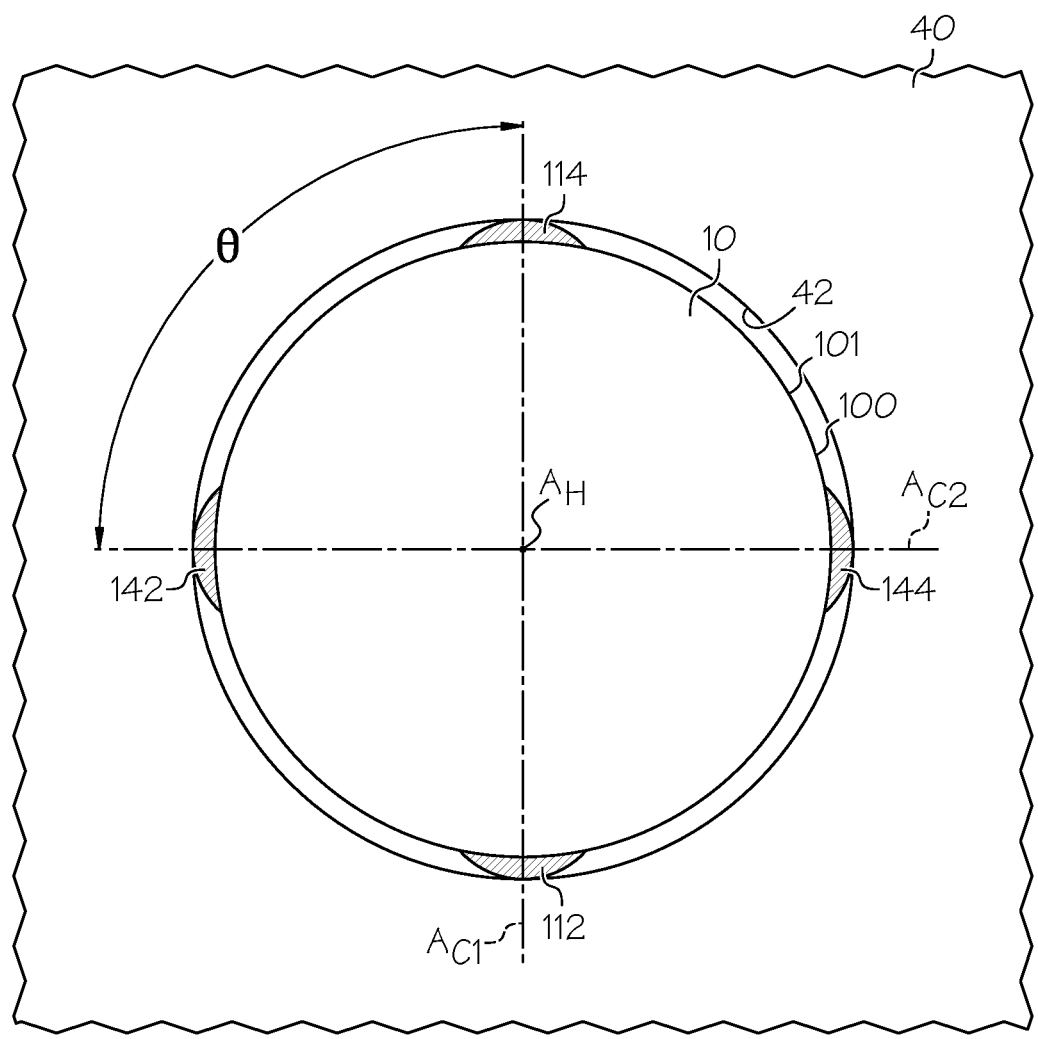
FIG. 5 is a top plan view of the probe portion and structure shown in FIG. 4.

Referring to FIGS. 2-4, 11-14, and 16, in one or more examples, the plug gauge 10 includes a first plunger 124 received in the internal volume 102 of the housing 100. As illustrated in FIGS. 2 and 3, the first plunger 124 defines a first plunger axis $A_{P1}$ that is aligned with the longitudinal axis $A_H$ of the housing 100. As illustrated in FIG. 4, the first plunger 124 is movable relative to the housing 100 along the first plunger axis $A_{P1}$. The first plunger 124 is biased into engagement with the plurality of first contact elements 112, 114 to urge the plurality of first contact elements 112, 114 radially outward through the plurality of first openings 104, 106.

As used herein, the term "aligned," in reference to two or more axes being aligned with each other refers to the two or more axes being parallel to each other or coincident with each other.

The first plunger 124 includes, or takes the form of, any suitable reciprocating body configured to move within the housing 100 along the first plunger axis $A_{P1}$. As illustrated in FIG. 2, with the first plunger 124 biased into engagement with the plurality of first contact elements 112, 114, a portion of each first contact element 112, 114 protrudes radially outward from the housing 100 through the respective one of the plurality of first openings 104, 106.

As illustrated in FIGS. 4 and 5, the first plunger 124 urges the plurality of first contact elements 112, 114 through the plurality of first openings 104, 106 a sufficient distance so that each first contact element 112, 114 is positioned to engage the interior surface defining the bore 42 when the housing 100 is inserted within the bore 42. In other words, with the first plunger 124 biased into engagement with the plurality of first contact elements 112, 114, a linear distance between ends of diametrically opposed ones of the plurality of first contact elements 112, 114 is greater than the bore-dimensions BD (FIG. 4) of the bore 42.

As illustrated in FIG. 4, when the housing 100 of the plug gauge 10 is inserted within the bore 42, engagement with the interior surface defining the bore 42 moves (e.g., pushes) the plurality of first contact elements 112, 114 radially inward through the plurality of first openings 104, 106 relative to the housing 100. The first plunger 124 linearly moves along the first plunger axis $A_{P1}$ relative to the housing 100 in response to the radially inward movement of the plurality of first contact elements 112, 114, as depicted by the directional arrow in FIG. 4.

Referring to FIGS. 1-4, 11-14, and 16, in one or more examples, the plug gauge 10 includes a first sensor 130 for sensing movement of the first plunger 124 relative to the housing 100. In one or more examples, the first sensor 130 is configured to alternatively or additionally sense movement of the plurality of first contact elements 112, 114 relative to the housing 100.

The first sensor 130 includes any one of various devices capable of directly or indirectly detecting relative movement of the first plunger 124, a change in relative linear location of the first plunger 124 along the first plunger axis $A_{P1}$, movement of the plurality of first contact elements 112, 114, or a change in relative radial location of the plurality of first contact elements 112, 114. The first sensor 130 measures a physical quantity associated with movement of the first plunger 124 and/or movement of the plurality of first contact elements 112, 114 and converts the measurement into a signal that can be read by an observer or by an instrument. The signal generated by the first sensor 130 corresponds to the bore-dimension BD of the bore 42 at a given location of the plurality of first contact elements 112, 114 along the longitudinal-central axis of the bore 42.

Referring to FIGS. 1-9, 11-14, and 16, in one or more examples, the plug gauge 10 includes a plurality of second contact elements 142, 144. Each second contact element 142, 144 of the plurality of second contact elements 142, 144 is at least partially received in a respective one of the plurality of second openings 108, 110 in the housing 100.

As illustrated in FIGS. 4 and 5, the plurality of second contact elements 142, 144 are configured to engage the interior surface defining the bore 42 when the housing 100 is inserted within the bore 42. Each second contact element 142, 144 of the plurality of second contact elements 142, 144 is moveable within the respective one of the plurality of second openings 108, 110 relative to the housing 100. As illustrated in FIG. 3, second contact element 142 is at least partially received in and is moveable within second opening 108 and second contact element 144 is at least partially received in and is moveable within second opening 110.

Referring to FIGS. 2-4, 6-9, 11-14, and 16, in one or more examples, the plug gauge 10 includes a second plunger 154 received in the internal volume 102 of the housing 100. As illustrated in FIGS. 2 and 3, the second plunger 154 defines a second plunger axis $A_{P2}$ that is aligned with the longitudinal axis $A_H$ of the housing 100. As illustrated in FIG. 4, the second plunger 154 is movable relative to the housing 100 along the second plunger axis $A_{P2}$. The second plunger 154 is biased into engagement with the plurality of second contact elements 142, 144 to urge the plurality of second contact elements 142, 144 radially outward through the plurality of second openings 108, 110.

The second plunger 154 includes, or takes the form of, any suitable reciprocating body configured to move within the housing 100 along the second plunger axis $A_{P2}$. As illustrated in FIG. 3, with the second plunger 154 biased into engagement with the plurality of second contact elements 142, 144, a portion of each second contact element 142, 144 protrudes radially outward from the housing 100 through the respective one of the plurality of second openings 108, 110.

As illustrated in FIGS. 4 and 5, the second plunger 154 urges the plurality of second contact elements 142, 144 through the plurality of second openings 108, 110 a sufficient distance so that each second contact element 142, 144 is positioned to engage the interior surface defining the bore 42 when the housing 100 is inserted within the bore 42. In other words, with the second plunger 154 biased into engagement with the plurality of second contact elements 142, 144, a linear distance between ends of diametrically opposed ones of the plurality of second contact elements 142, 144 is greater than the bore-dimensions BD (FIG. 4) of the bore 42.

As illustrated in FIG. 4, when the housing 100 of the plug gauge 10 is inserted within the bore 42, engagement with the interior surface defining the bore 42 moves (e.g., pushes) the plurality of second contact elements 142, 144 radially inward through the plurality of second openings 108, 110 relative to the housing 100. The second plunger 154 linearly moves along the second plunger axis $A_{P2}$ relative to the housing 100 in response to the radially inward movement of the plurality of second contact elements 142, 144, as depicted by the directional arrow in FIG. 4.

Referring to FIGS. 1-4, 6-9, 11-14, and 16, in one or more examples, the plug gauge 10 includes a second sensor 160 for sensing movement of the second plunger 154 relative to the housing 100. In one or more examples, the second sensor 160 is configured to alternatively or additionally sense movement of the plurality of second contact elements 142, 144 relative to the housing 100.

The second sensor 160 includes any one of various devices capable of directly or indirectly detecting relative movement of the second plunger 154, a change in relative linear location of the second plunger 154 along the second plunger axis $A_{P2}$, movement of the plurality of second contact elements 142, 144, or a change in relative radial location of the plurality of second contact elements 142, 144. The second sensor 160 measures a physical quantity associated with movement of the second plunger 154 and/or movement of the plurality of second contact elements 142, 144 and converts the measurement into a signal that can be read by an observer or by an instrument. The signal generated by the second sensor 160 corresponds to the bore-dimension BD of the bore 42 at a given location of the plurality of second contact elements 142, 144 along the longitudinal-central axis of the bore 42.

In an example, the first sensor 130 and the second sensor 160 are the same type of sensor device. In another example, the first sensor 130 and the second sensor 160 are different types of sensor devices.

Referring to FIGS. 2 and 3, in an example, the plurality of second openings 108, 110 is displaced a pre-defined non-zero distance D along the longitudinal axis $A_H$ from the plurality of first openings 104, 106. Similarly, the plurality of second contact elements 142, 144 is displaced the pre-defined non-zero distance D along the longitudinal axis $A_H$ from the plurality of first contact elements 112, 114. The displacement distance D between the plurality of second openings 108, 110 and the plurality of first openings 104, 106 (and between the plurality of second contact elements 142, 144 and the plurality of first contact elements 112, 114) enables simultaneous diametric measurements of the bore 42 to be taken at a plurality (e.g., two) different linear measurement locations of the bore 42 along the longitudinal-central axis of the bore 42. The linear measurement locations are linearly spaced apart by a distance substantially equal to the displacement distance D.

Referring to FIG. 5, in an example, the plurality of second openings 108, 110 is displaced a non-zero angle Θ about the longitudinal axis $A_H$ relative to the plurality of first openings 104, 106. Similarly, the plurality of second contact elements 142, 144 is displaced the non-zero angle Θ about the longitudinal axis $A_H$ relative to the plurality of first contact elements 112, 114. The displacement angle Θ between the plurality of second openings 108, 110 and the plurality of first openings 104, 106 (and between the plurality of second contact elements 142, 144 and the plurality of first contact elements 112, 114) enables simultaneous diametric measurements of the bore 42 to be taken at a plurality (e.g., two) different angular measurement locations of the bore 42 along a circumference of the bore 42. The angular measurement locations are angularly spaced apart by a non-zero angle substantially equal to the displacement angle Θ.

As illustrated in FIG. 5, in an example, the non-zero angle Θ is about 90 degrees. The non-zero angle Θ being about 90 degrees enables diametric measurements of the bore 42 to be simultaneously taken at angular intervals of 90 degrees relative to each other. Other values for the non-zero angle Θ are also contemplated.

Referring to FIGS. 1-5, in an example, the housing 100 is generally tubular. The tubular shape of the housing 100 defines the internal volume 102 of the housing 100 and enables at least some of the components of the plug gauge 10 (e.g., the plurality of first contact elements 112, 114, the first plunger 124, the plurality of second contact elements 142, 144, and the second plunger 154) to be enclosed by and protected within the housing 100. The tubular shape of the housing 100 also enables the housing 100 to be inserted within (at least partially through) the bore 42 having a generally circular shape in cross-section, viewed along the longitudinal-central axis of the bore 42.

Referring to FIGS. 1-9, 11-14, and 16, in one or more examples, the housing 100 defines an outer surface 101. Portions of the plurality of first contact elements 112, 114 and portions of the plurality of second contact elements 142, 144 protrude radially outward beyond the outer surface 101. An external dimension of the outer surface 101 approximates, but is less than, the bore-dimensions BD of the bore 42 so that the housing 100 freely fits within the bore 42.

As illustrated in FIG. 2, with the first plunger 124 biased into engagement with plurality of first contact elements 112, 114, a larger portion of each first contact element 112, 114 protrudes radially outward beyond the outer surface 101. As illustrated in FIGS. 4 and 5, with the housing 100 inserted within the bore 42, a smaller portion of each first contact element 112, 114 protrudes radially outward beyond the outer surface 101. As illustrated in FIG. 2, with the second plunger 154 biased into engagement with plurality of second contact elements 142, 144, a larger portion of each second contact element 142, 144 protrudes radially outward beyond the outer surface 101. As illustrated in FIGS. 4 and 5, with the housing 100 inserted within the bore 42, a smaller portion of each second contact element 142, 144 protrudes radially outward beyond the outer surface 101.

In an example, the outer surface 101 is substantially cylindrical. The cylindrical shape of the outer surface 101 enables the housing 100 to be inserted within (at least partially through) the bore 42 having a generally circular shape in cross-section, viewed along the longitudinal-central axis of the bore 42.

Referring to FIGS. 1-9, 11-14, and 16, in one or more examples, the plurality of first contact elements 112, 114 consists of two first contact elements 112, 114 that are aligned along a first contact element axis $A_{C1}$ (FIGS. 2 and 5). The first contact element axis $A_{C1}$ is generally perpendicular to the longitudinal axis $A_H$. As illustrated in FIGS. 2 and 5, the two first contact elements 112, 114 being aligned along the first contact element axis $A_{C1}$ enables a first dimension measurement to be taken between two diametrically opposed points on the interior surface defining the bore 42 at a given location along longitudinal-central axis of the bore 42.

In another example, the plurality of first contact elements 112, 114 consists of four, six, or eight first contact elements 112, 114, each pair being aligned along the respective first contact element axis $A_{C1}$.

Referring to FIGS. 1-9, 11-14, and 16, in one or more examples, the plurality of second contact elements 142, 144 consists of two second contact elements 142, 144 that are aligned along a second contact element axis $A_{C2}$ (FIGS. 3 and 5). The second contact element axis $A_{C2}$ is generally perpendicular to the longitudinal axis $A_H$. As illustrated in FIGS. 3 and 5, the two second contact elements 142, 144 being aligned along the second contact element axis $A_{C2}$ enables a second dimension measurement to be taken between two diametrically opposed points on the interior surface defining the bore 42 at a given location along longitudinal-central axis of the bore 42.

In another example, the plurality of second contact elements 142, 144 consists of four, six, or eight second contact elements 142, 144, each pair being aligned along the respective second contact element axis $A_{C2}$.

As illustrated in FIGS. 2 and 3, in an example, the second contact element axis $A_{C2}$ is displaced the pre-defined non-zero distance D along the longitudinal axis $A_H$ from the first contact element axis $A_{C1}$. The displacement distance D between second contact element axis $A_{C2}$ and the first contact element axis $A_{C1}$ enables the first dimension measurement and the second dimension measurement to be taken at a different locations along the longitudinal-central axis of the bore 42.

As illustrated in FIG. 5, in an example, the second contact element axis $A_{C2}$ is disposed at a non-zero angle $\Theta$ relative to the first contact element axis $A_{C1}$. The displacement angle $\Theta$ between second contact element axis $A_{C2}$ and the first contact element axis $A_{C1}$ enables the first dimension measurement and the second dimension measurement to be taken at a different angular locations along the circumference of the bore 42. In an example, the non-zero angle $\Theta$ is about 90 degrees. Other values for the non-zero angle $\Theta$ are also contemplated.

Referring to FIGS. 2-4, 6-9, 11-14, and 16, in one or more examples, each first contact element 112, 114 of the plurality of first contact elements 112, 114 is substantially spherical. Similarly, in an example, each second contact element 142, 144 of the plurality of second contact elements 142, 144 is substantially spherical. The substantially spherical shape of the plurality of first contact elements 112, 114 and the plurality of second contact elements 142, 144 provides a smooth, contoured contact surface to engage an edge of the structure 40 defining an end of the bore 42 when inserting the housing 100 within the bore 42. The smooth, contoured contact surface prevents the plurality of first contact elements 112, 114 and the plurality of second contact elements 142, 144 from catching on the edge of the bore 42.

In another example, each first contact element 112, 114 of the plurality of first contact elements 112, 114 and/or each second contact element 142, 144 of the plurality of second contact elements 142, 144 has any one of various other shapes. For example, each first contact element 112, 114 and/or each second contact element 142, 144 include a generally cylindrical shape with rounded or semi-spherical ends.

Referring to FIGS. 2-4, 6-9, 11-14, and 16, in one or more examples, each first contact element 112, 114 of the plurality of first contact elements 112, 114 is connected to the housing 100 by a retainer 116, 118 (FIG. 2) associated with the respective first contact element 112, 114. Similarly, in an example, each second contact element 142, 144 of the plurality of second contact elements 142, 144 is connected to the housing 100 by a retainer 146, 148 (FIG. 3) associated with the respective second contact element 142, 144.

As illustrated in FIGS. 2, 6, 8, 11, 13, and 16, each first retainer 116, 118 connects the respective first contact element 112, 114 to the housing 100 and holds the respective first contact element 112, 114 within the associated first opening 104, 106. Each first retainer 116, 118 includes, or takes the form of, any suitable flexible body configured to support the respective first contact element 112, 114 within the associated first opening 104, 106 while allowing radially inward and outward movement of the respective first contact element 112, 114 through the associated first opening 104, 106.

As illustrated in FIGS. 3, 4, 7, 9, 12, and 14, each second retainer 146, 148 connects the respective second contact element 142, 144 to housing 100 and holds the respective second contact element 142, 144 within the associated second opening 108, 110. Each second retainer 146, 148 includes, or takes the form of, any suitable flexible body configured to support the respective second contact element 142, 144 within the associated second opening 108, 110 while allowing radially inward and outward movement of the respective second contact element 142, 144 through the associated second opening 108, 110.

In an example, one end of each first retainer 116, 118 is coupled to an internal surface of the housing 100 and an opposing end of each first retainer 116, 118 is coupled to the respective first contact element 112, 114. Similarly, in an example, one end of each second retainer 146, 148 is coupled on the internal surface of the housing 100 and an opposing end of each second retainer 146, 148 is coupled to the respective second contact element 142, 144. In an example, each first retainer 116, 118 is coupled to the housing 100 by a respective first mechanical fastener 120, 122 (FIG. 2). Similarly, in an example, each second retainer 146, 148 is coupled to the housing 100 by a respective second mechanical fastener 150, 152 (FIG. 3).

Referring to FIGS. 2-4, 6-9, 11-14, and 16, in one or more examples, the plug gauge 10 includes a first biasing element 170 positioned to bias the first plunger 124 into engagement with the plurality of first contact elements 112, 114. The first biasing element 170 is configured to exert a biasing force on the first plunger 124 along the first plunger axis $A_{P1}$ in a direction toward the plurality of first contact elements 112, 114 so that the first plunger 124 urges each first contact element 112, 114 radially outward through the respective first opening 104, 106. The biasing force of the first biasing element 170 is overcome in response to a radially inward force applied to the plurality of first contact elements 112, 114 by the interior surface defining the bore 42 when the housing 100 is inserted within the bore 42, which in turn linearly moves the first plunger 124 in a direction opposite to the direction of the biasing force.

As illustrated in FIGS. 2-4, 6-9, 11-14, and 16, in an example, the first biasing element 170 includes, or takes the form of, a spring 172. In other examples, the first biasing element 170 includes any one of various types of suitable biasing mechanisms.

Referring to FIGS. 2-4, 6-9, 11-14, and 16, in one or more examples, the plug gauge 10 includes a second biasing element 174 positioned to bias the second plunger 154 into engagement with the plurality of second contact elements 142, 144. The second biasing element 174 is configured to exert a biasing force on the second plunger 154 along the second plunger axis $A_{P2}$ in a direction toward the plurality of second contact elements 142, 144 so that the second plunger 154 urges each second contact element 142, 144 radially outward through the respective second opening 108, 110. The biasing force of the second biasing element 174 is overcome in response to a radially inward force applied to the plurality of second contact elements 142, 144 by the interior surface defining the bore 42 when the housing 100 is inserted within the bore 42, which in turn linearly moves the second plunger 154 in a direction opposite to the direction of the biasing force.

In an example, the second biasing element 174 includes, or takes the form of, a spring. In other examples, the second biasing element 174 includes any one of various types of suitable biasing mechanisms. In an example, the first biasing element 170 and the second biasing element 174 are the same type of biasing mechanism. In another example, the first biasing element 170 and the second biasing element 174 are different types of biasing mechanism. In an example, at least one of the first biasing element 170 and the second biasing element 174 is positioned in the internal volume 102 of the housing 100. In an example, both the first biasing element 170 and the second biasing element 174 are positioned in the internal volume 102 of the housing 100.

Referring to FIGS. 2 and 3, in an example, the plug gauge 10 includes a set screw 176 threaded into engagement with the housing 100. The first biasing element 170 is positioned between the set screw 176 and the first plunger 124. The set screw 176 enables selective adjustment of the biasing force applied to the first plunger 124 by the first biasing element 170. For example, rotation of the set screw in a first rotational direction compresses the spring 172 to increase the biasing force and rotation of the set screw in a second rotational direction, opposite the first rotational direction, decompresses the spring 172 to decrease the biasing force.

Referring to FIGS. 2 and 3, in an example, the first plunger 124 includes a head portion 126 that engages the plurality of first contact elements 112, 114. The head portion 126 includes an angled surface 128. The angled surface 128 of the head portion 126 of the first plunger 124 provides a smooth, contoured contact surface to engage each first contact element 112, 114. The angled surface 128 prevents the head portion 126 of the first plunger 124 from catching on the plurality of first contact elements 112, 114 when the first plunger 124 moves along the first plunger axis $A_{P1}$.

Although not explicitly identified, in an example, the second plunger 154 includes a head portion that engages the plurality of second contact elements 142, 144. The head portion includes an angled surface. The angled surface of the head portion of the second plunger 154 provides a smooth, contoured contact surface to engage each second contact element 142, 144. The angled surface prevents the head portion of the second plunger 154 from catching on the plurality of second contact elements 142, 144 when the second plunger 154 moves along the second plunger axis $A_{P2}$.

Referring to FIG. 1, in an example, the housing 100, the plurality of first contact elements 112, 114, the first plunger 124, the first sensor 130, the plurality of second contact elements 142, 144, the second plunger 154, and the second sensor 160 include, or form, a probe portion 12 of the plug gauge 10. The plug gauge 10 further includes a coupling portion 14 connected to the probe portion 12. The probe portion 12 of the plug gauge 10 is formed by the portion of the plug gauge 10 that intended to be inserted within the bore 42. The coupling portion 14 is configured to enable the probe portion 12 to be coupled to a support 20.

Referring to FIGS. 1-4, 6-9, 11-14, and 16, in one or more examples, at least one of the first sensor 130 and the second sensor 160 is positioned in the internal volume 102 of the housing 100. In one or more examples, both the first sensor 130 and the second sensor 160 are positioned in the internal volume 102 of the housing 100. Positioning the first sensor 130 and/or the second sensor 160 within the internal volume 102 of the housing 100 provides an enclosed operative environment and protects the first sensor 130 and the second sensor 160 during use of the plug gauge 10. Positioning the first sensor 130 and/or the second sensor 160 within the internal volume 102 of the housing 100 also enables the plug gauge 10 to simultaneously take two discrete measurements of the bore 42 at two different locations along the longitudinal-central axis of the bore 42 using two discrete measuring assemblies: (1) the plurality of first contact elements 112, 114, the first plunger 124, and the first sensor 130; and (2) the plurality of second contact elements 142, 144, the second plunger 154, and the second sensor 160.

Referring generally to FIGS. 1-4 and particularly to FIGS. 6-12, in an example, at least one of the first sensor 130 and the second sensor 160 includes a linear position sensor 200, 300, 400. In an example, both the first sensor 130 and the second sensor 160 comprise a linear position sensor 200, 300, 400. The linear position sensor 200, 300, 400 includes any one of various devices capable of measuring a position of a respective one of the first plunger 124 and the second plunger 154. The linear position sensor may be an absolute position sensor or a relative position sensor (e.g., a displacement sensor).

As illustrated in FIG. 4, in an example, engagement with the interior surface defining the bore 42 moves the plurality of first contact elements 112, 114 radially inward through the plurality of first openings 104, 106. Radially inward movement of the plurality of first contact elements 112, 114 moves the first plunger 124 and, thereby, changes the position of the first plunger 124. As illustrated in FIGS. 6-12, in one or more examples, the linear position sensor 200, 300, 400 of the first sensor 130 detects the linear position or displacement of the first plunger 124. The linear position sensor 200, 300, 400 of the first sensor 130 converts the position or linear displacement of the first plunger 124 from a reference (e.g., a zero or null position) into a proportional electrical signal. The signal generated by the linear position sensor 200, 300, 400 represents the bore-dimension BD of the bore 42 at a given location of the plurality of first contact elements 112, 114 along the longitudinal-central axis of the bore 42.

As illustrated in FIG. 4, in an example, engagement with the interior surface defining the bore 42 moves the plurality of second contact elements 142, 144 radially inward through the plurality of second openings 108, 110. Radially inward movement of the plurality of second contact elements 142, 144 moves the second plunger 154 and, thereby, changes the position of the second plunger 154. As illustrated in FIGS. 6-12, in one or more examples, the linear position sensor 200, 300, 400 of the second sensor 160 detects the linear position or displacement of the second plunger 154. The linear position sensor 200, 300, 400 of the second sensor 160 converts the position or linear displacement of the second plunger 154 from a reference (e.g., a zero or null position) into a proportional electrical signal. The signal generated by the linear position sensor 200, 300, 400 represents the bore-dimension BD of the bore 42 at a given location of the plurality of second contact elements 142, 144 along the longitudinal-central axis of the bore 42.

Figure 6:
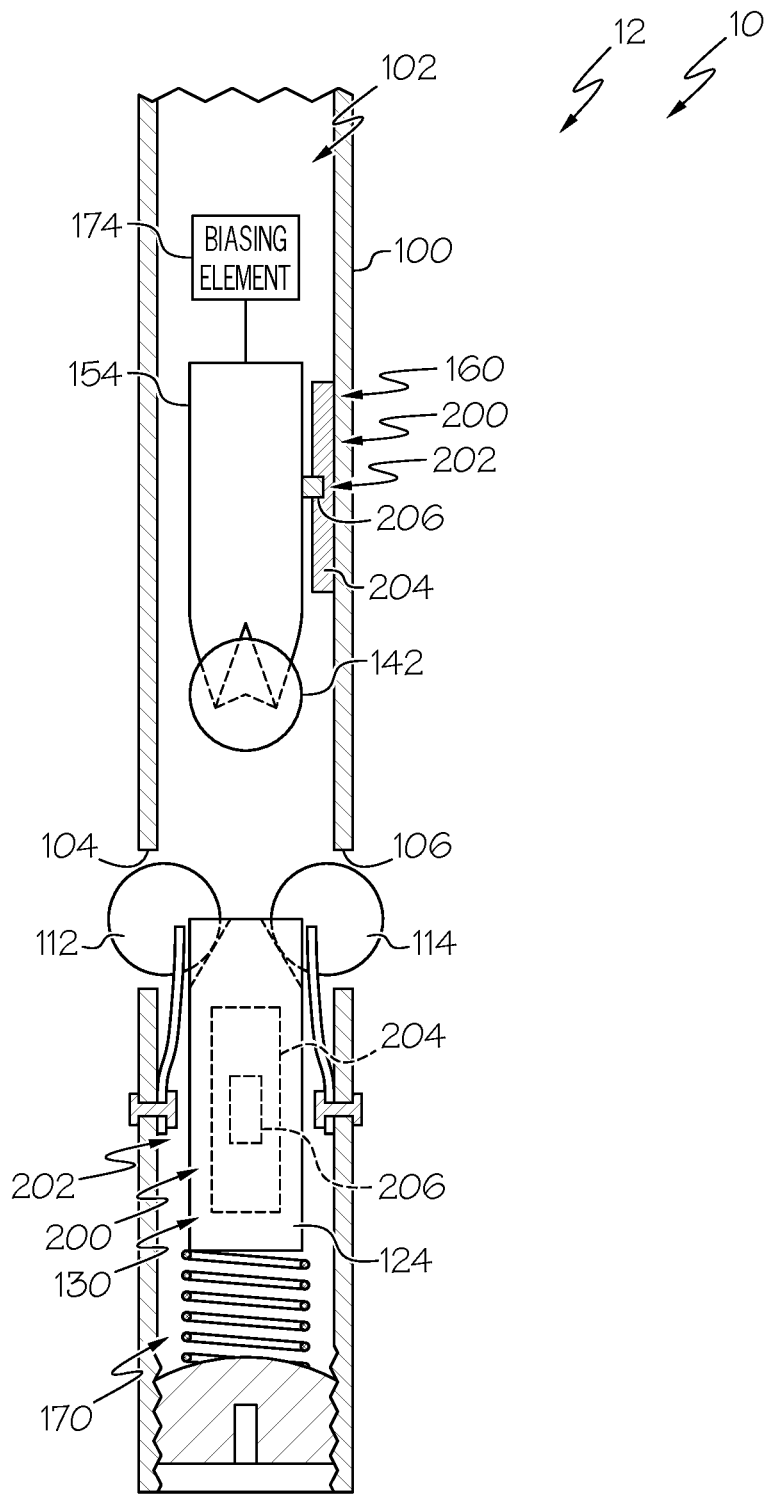
FIG. 6 is an elevational view, in cross-section, of one variation in which the probe portion of the disclosed plug gauge includes a linear potentiometer.
Figure 7:
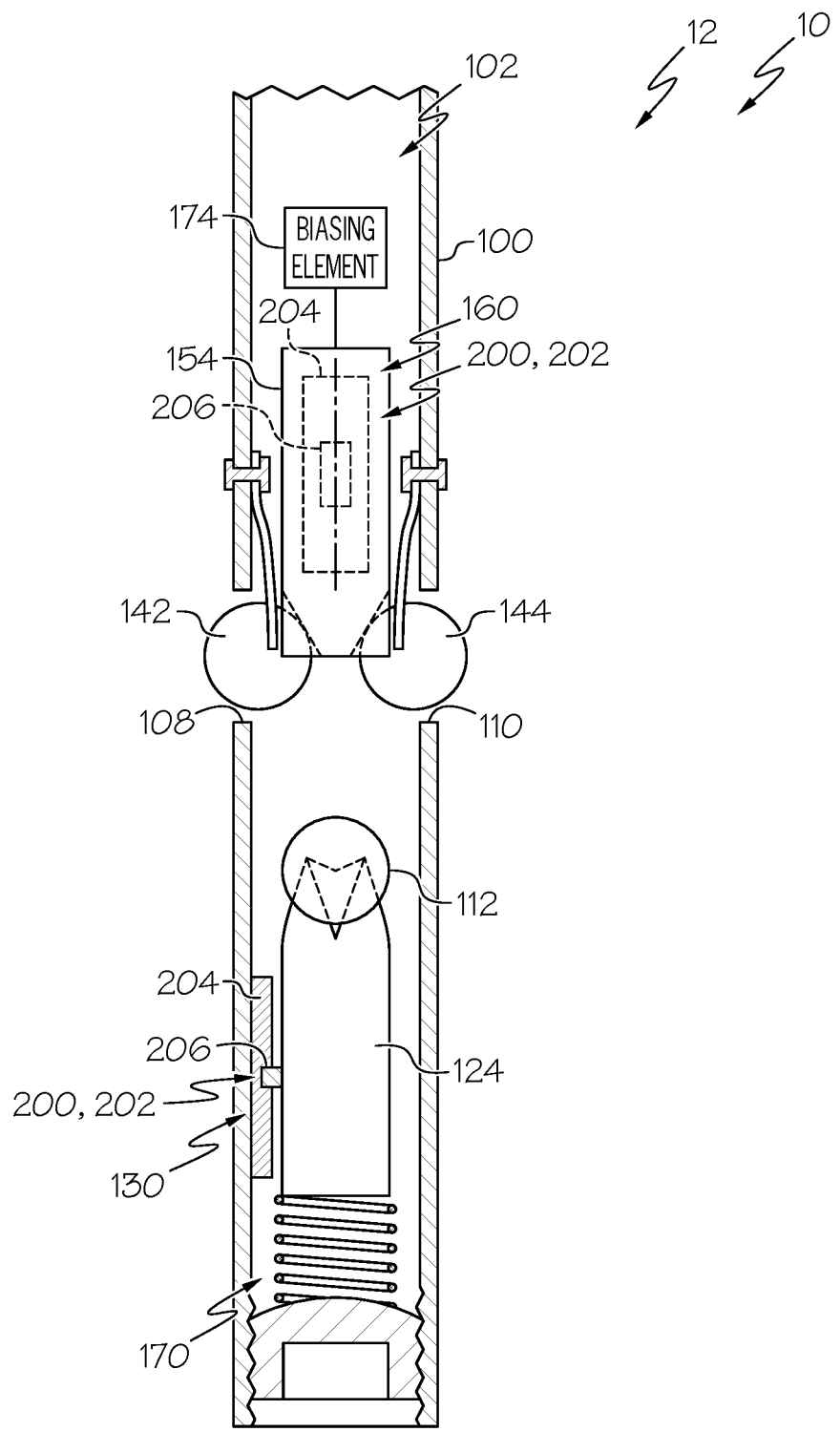
FIG. 7 is an elevational view, in cross-section, of the probe portion of FIG. 6 shown rotated ninety degrees from the orientation shown in FIG. 6.

Referring generally to FIGS. 1-4 and particularly to FIGS. 6 and 7, in an example, the first sensor 130 includes, or takes the form of, a linear potentiometer 202. Use of the linear potentiometer 202 as the first sensor 130 provides a small, simple, and economical means for measuring the bore-dimension BD of the bore 42 by measuring the position or displacement of the first plunger 124.

As illustrated in FIGS. 6 and 7, in an example, the linear potentiometer 202 includes a resistive element 204 connected to one of the housing 100 and the first plunger 124.

The linear potentiometer 202 also includes a wiper 206 operatively engaged (e.g., in contact) with the resistive element 204. The wiper 206 is connected to another one of the housing 100 and the first plunger 124.

For the purpose of the present disclosure, when connected to the housing 100, the resistive element 204 or the wiper 206 may be referred to as a fixed member and when connected to the first plunger 124, the resistive element 204 or the wiper 206 may be referred to as a moving member. Linear movement of the first plunger 124 along the first plunger axis $A_{P1}$ relative to the housing 100, in response to radially inward movement of the plurality of first contact elements 112, 114, moves the moving member relative to the fixed member. Relative movement of the wiper 206 along the resistive element 204 generates an electric potential (voltage). The linear potentiometer 202 measures the voltage and generates an output signal that is ratiometric with respect to the measured voltage. The output signal generated by the linear potentiometer 202 represents the bore-dimension BD of the bore 42 at a given location of the plurality of first contact elements 112, 114 along the longitudinal-central axis of the bore 42.

Referring generally to FIGS. 1-4 and particularly to FIGS. 6 and 7, in an example, the second sensor 160 includes the linear potentiometer 202. Use of the linear potentiometer 202 as the second sensor 160 provides a small, simple, and economical means for measuring the bore-dimension BD of the bore 42 by measuring the position or displacement of the second plunger 154.

As illustrated in FIGS. 6 and 7, in an example, the linear potentiometer 202 includes the resistive element 204 connected to one of the housing 100 and the second plunger 154. The linear potentiometer 202 also includes the wiper 206 operatively engaged (e.g., in contact) with the resistive element 204. The wiper 206 is connected to another one of the housing 100 and the second plunger 154. Linear movement of the second plunger 154 along the second plunger axis $A_{P2}$ relative to the housing 100, in response to radially inward movement of the plurality of second contact elements 142, 144, moves the moving member relative to the fixed member. Relative movement of the wiper 206 along the resistive element 204 generates an electric potential (voltage). The linear potentiometer 202 measures the voltage and generates an output signal that is ratiometric with respect to the measured voltage. The output signal generated by the linear potentiometer 202 represents the bore-dimension BD of the bore 42 at a given location of the plurality of second contact elements 142, 144 along the longitudinal-central axis of the bore 42.

Figure 8:
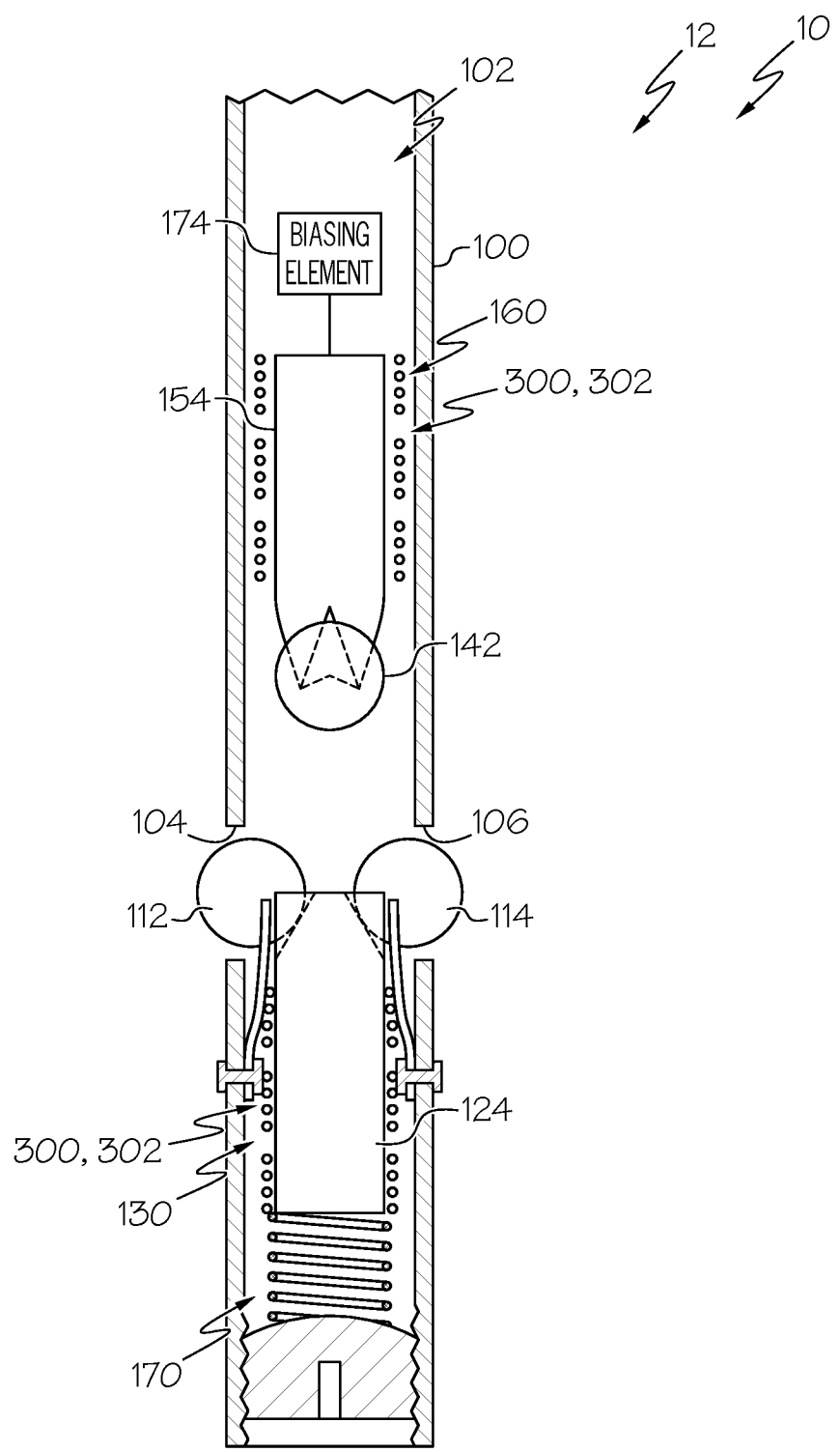
FIG. 8 is an elevational view, in cross-section, of another variation in which the probe portion of the disclosed plug gauge includes a linear variable differential transformer.
Figure 9:
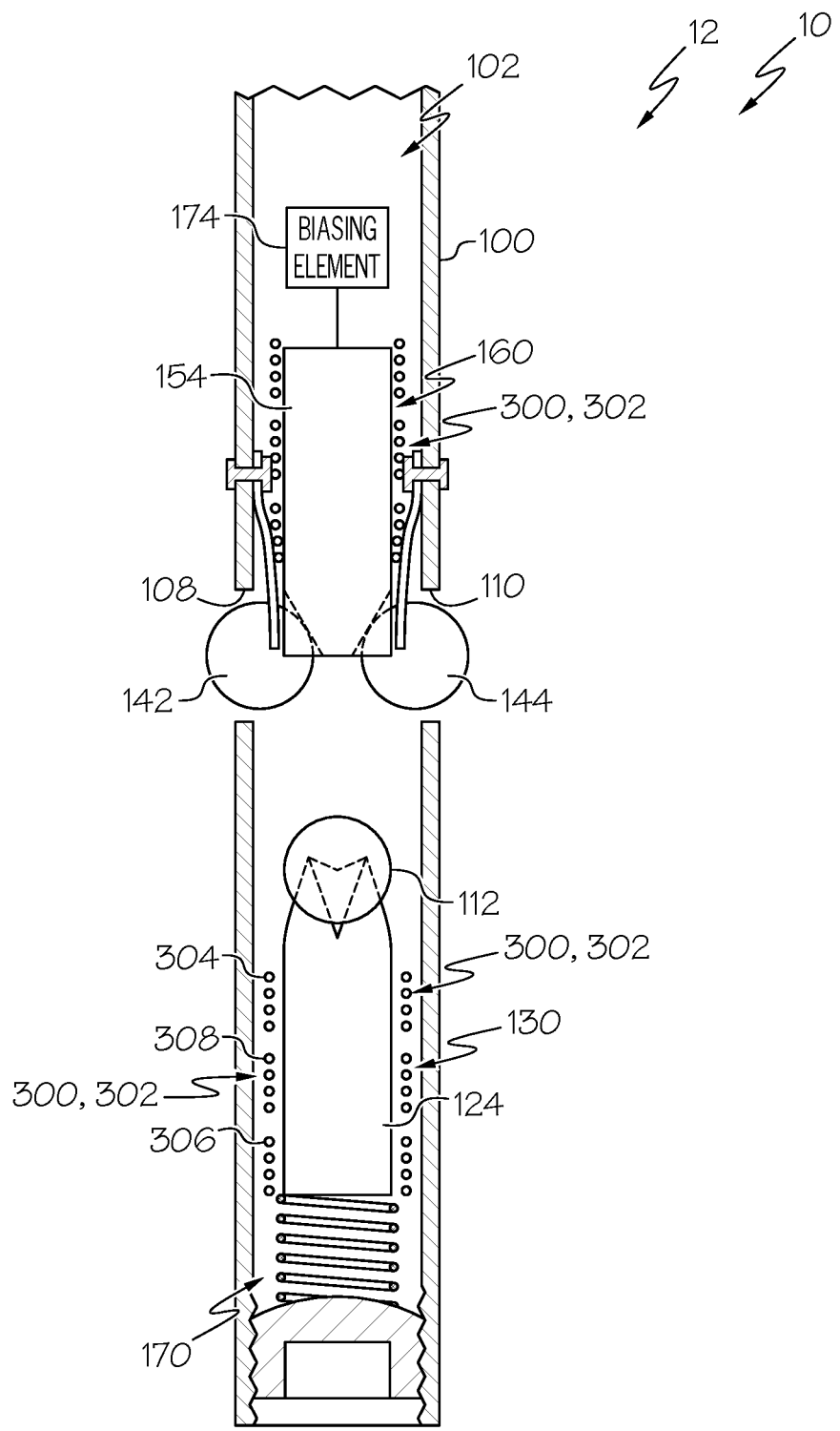
FIG. 9 is an elevational view, in cross-section, of the probe portion of FIG. 8 shown rotated ninety degrees from the orientation shown in FIG. 8.
Figure 10:
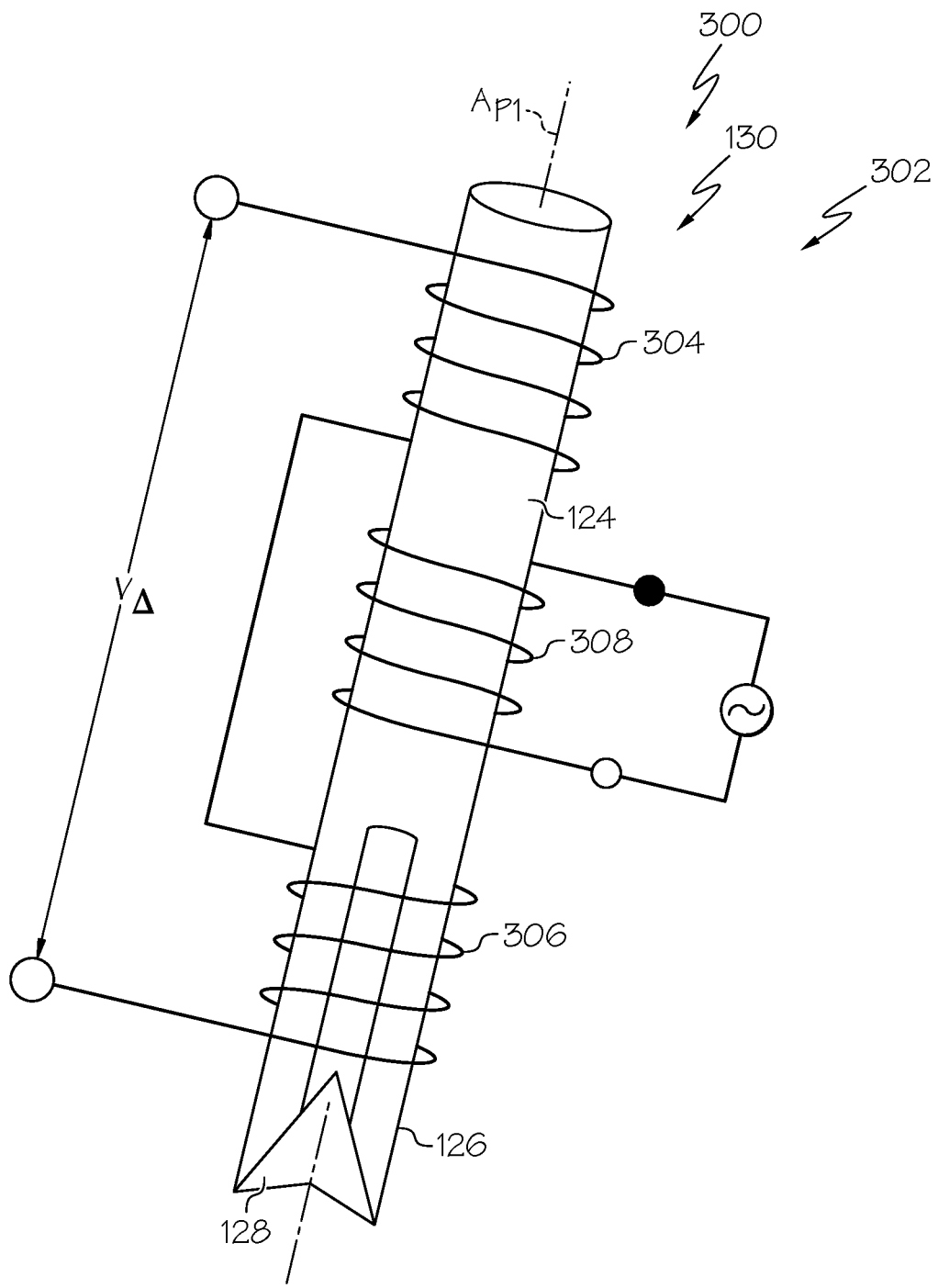
FIG. 10 is a perspective view of a detailed portion of the probe portion shown in FIG. 9.

Referring generally to FIGS. 1-4 and particularly to FIGS. 8-10, in an example, the first sensor 130 includes a linear variable differential transformer 302. Use of the linear variable differential transformer 302 as the first sensor 130 provides a robust, versatile, and reliable means for measuring the bore-dimension BD of the bore 42 by measuring the position or displacement of the first plunger 124.

As illustrated in FIGS. 8-10, in an example, the linear variable differential transformer 302 includes a first secondary coil 304 and a second secondary coil 306, both positioned in the housing 100 and received over the first plunger 124. The linear variable differential transformer 302 also includes a primary coil 308 positioned in the housing 100 and received over the first plunger 124. The primary coil 308 is disposed between the first secondary coil 304 and the second secondary coil 306 along the first plunger axis $A_{P1}$.

An alternating current drives the primary coil 308 and causes a voltage to be induces in the first secondary coil 304 and the second secondary coil 306. When the first plunger 124 moves along the first plunger axis $A_{P1}$, an inductance link between the primary coil 308 and the first secondary coil 304 and the second secondary coil 306 changes and causes the induced voltage to change. The linear variable differential transformer 302 measures the voltage differential and generates an output signal. The output signal generated by the linear variable differential transformer 302 represents the bore-dimension BD of the bore 42 at a given location of the plurality of first contact elements 112, 114 along the longitudinal-central axis of the bore 42.

Referring to FIGS. 8-10, in an example, the first plunger 124 includes a ferromagnetic material. In an example, the first plunger 124 is made of the ferromagnetic material (e.g., an iron-nickel alloy). In another example, the ferromagnetic material is coupled to an exterior of the first plunger 124.

Referring generally to FIGS. 1-4 and particularly to FIGS. 8-10, in an example, the second sensor 160 includes the linear variable differential transformer 302. Use of the linear variable differential transformer 302 as the second sensor 160 provides a robust, versatile, and reliable means for measuring the bore-dimension BD of the bore 42 by measuring the position or displacement of the second plunger 154.

As illustrated in FIGS. 8-10, in an example, the linear variable differential transformer 302 includes the first secondary coil 304 and the second secondary coil 306, both positioned in the housing 100 and received over the second plunger 154. The linear variable differential transformer 302 also includes the primary coil 308 positioned in the housing 100 and received over the second plunger 154. The primary coil 308 is disposed between the first secondary coil 304 and the second secondary coil 306 along the second plunger axis $A_{P2}$. When the second plunger 154 moves along the second plunger axis $A_{P2}$, an inductance link between the primary coil 308 and the first secondary coil 304 and the second secondary coil 306 changes and causes the induced voltage to change. The linear variable differential transformer 302 measures the voltage differential and generates an output signal. The output signal generated by the linear variable differential transformer 302 represents the bore-dimension BD of the bore 42 at a given location of the plurality of second contact elements 142, 144 along the longitudinal-central axis of the bore 42.

Figure 11:
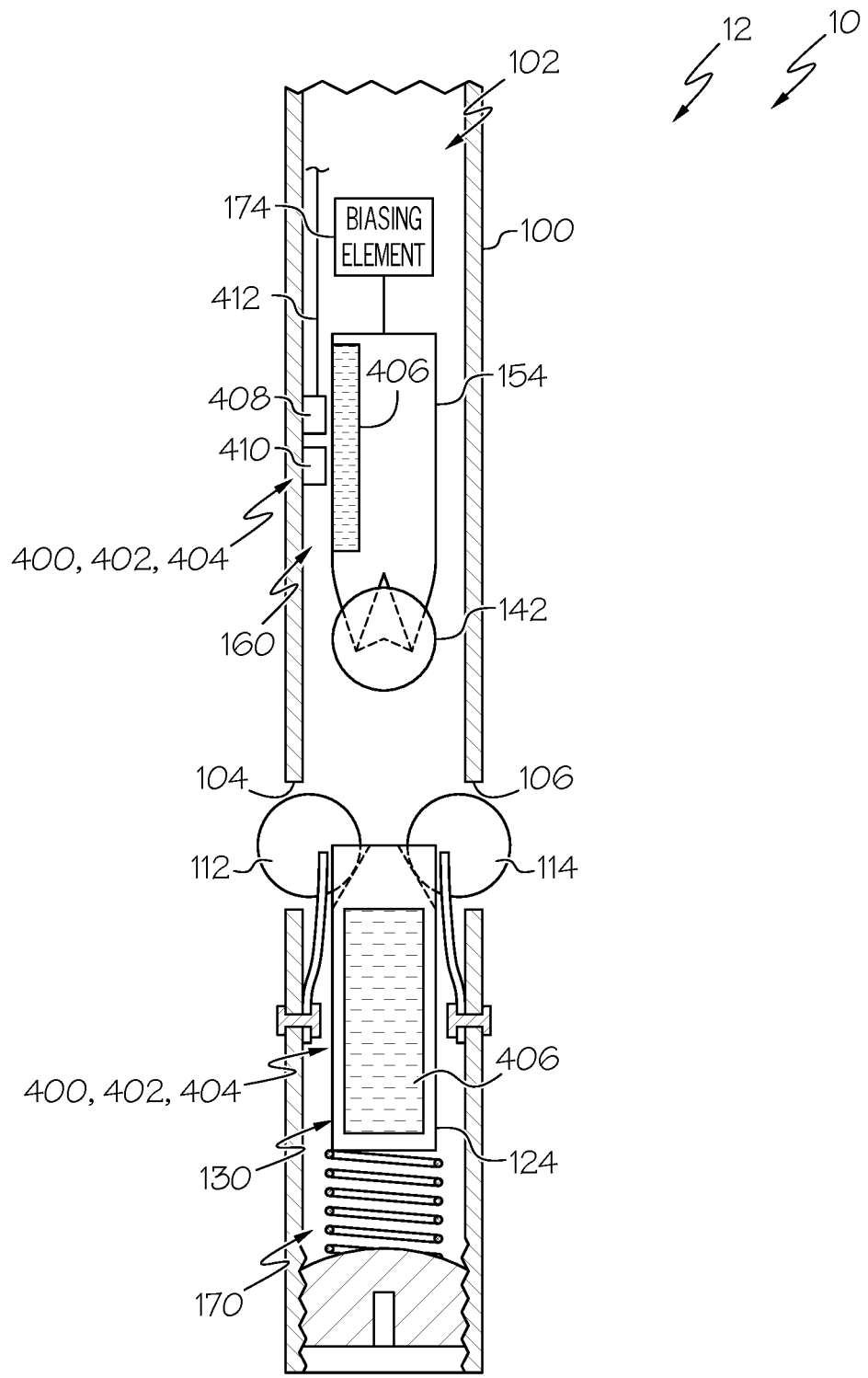
FIG. 11 is an elevational view, in cross-section, of another variation in which the probe portion of the disclosed plug gauge includes a linear encoder.
Figure 12:
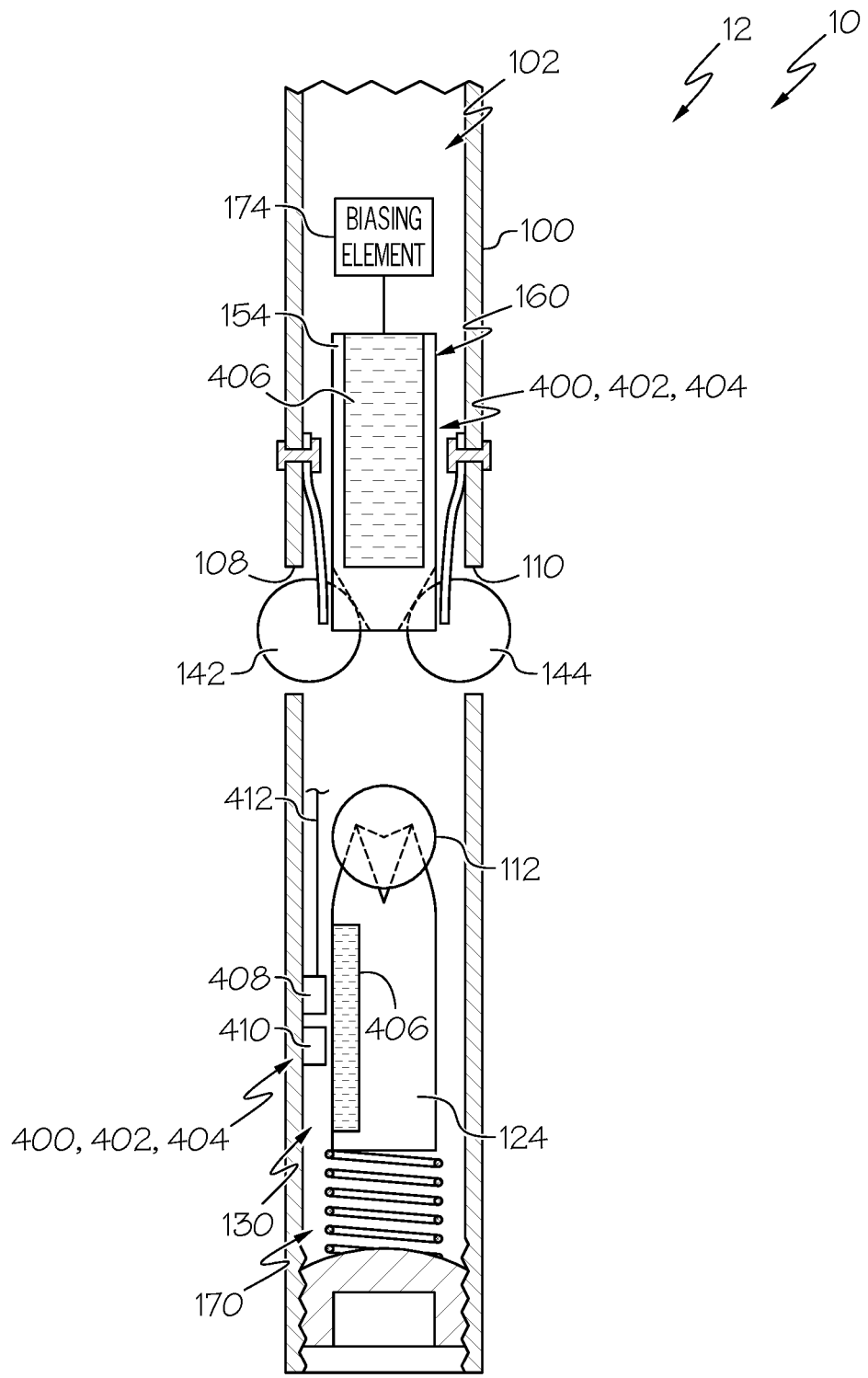
FIG. 12 is an elevational view, in cross-section, of the probe portion of FIG. 11 shown rotated ninety degrees from the orientation shown in FIG. 11.

Referring generally to FIGS. 1-4 and particularly to FIGS. 11 and 12, in an example, the first sensor 130 includes a linear encoder 402. Use of the linear encoder 402 as the first sensor 130 provides a reliable and precise means for measuring the bore-dimension BD of the bore 42 by measuring the position or displacement of the first plunger 124.

Referring generally to FIGS. 1-4 and particularly to FIGS. 11 and 12, in an example, the second sensor 160 includes the linear encoder 402. Use of the linear encoder 402 as the second sensor 160 provides a reliable and precise means for measuring the bore-dimension BD of the bore 42 by measuring the position or displacement of the second plunger 154.

Referring generally to FIGS. 1-4 and particularly to FIGS. 11 and 12, in an example, the first sensor 130 includes an optical linear encoder 404. The optical linear encoder 404 includes a scale 406 on the first plunger 124. The optical linear encoder 404 also includes a light source 408 positioned in the internal volume 102 of the housing 100 to illuminate at least a portion of the scale 406. The optical linear encoder 404 further includes a light detector 410 positioned in the internal volume 102 of the housing 100 to receive light reflected from the scale 406.

When the first plunger 124 moves along the first plunger axis $A_{P1}$, the optical linear encoder 404 uses the light detector 410 to read linear graduations formed on the scale 406 from the light reflected from the scale 406. The optical linear encoder 404 measures the displacement of the first plunger 124 based on the graduations differential and generates an output signal. The output signal generated by the optical linear encoder 404 represents the bore-dimension BD of the bore 42 at a given location of the plurality of first contact elements 112, 114 along the longitudinal-central axis of the bore 42.

In an example, the second sensor 160 includes the optical linear encoder 404. The optical linear encoder 404 includes the scale 406 on the second plunger 154. The optical linear encoder 404 also includes the light source 408 positioned in the internal volume 102 of the housing 100 to illuminate at least a portion of the scale 406. The optical linear encoder 404 further includes the light detector 410 positioned in the internal volume 102 of the housing 100 to receive light reflected from the scale 406.

When the second plunger 154 moves along the second plunger axis $A_{P2}$, the optical linear encoder 404 uses the light detector 410 to read linear graduations formed on the scale 406 from the light reflected from the scale 406. The optical linear encoder 404 measures the displacement of the second plunger 154 based on the graduations differential and generates an output signal. The output signal generated by the optical linear encoder 404 represents the bore-dimension BD of the bore 42 at a given location of the plurality of second contact elements 142, 144 along the longitudinal-central axis of the bore 42.

Referring to FIGS. 11 and 12, in an example, the light source 408 includes an optical fiber 412. In other examples, the light source 408 is any one of a laser, a hollow tube bore scope, a back-lit encoder with a photo sensor, and the like.

Referring generally to FIGS. 1-4 and particularly to FIGS. 13-17, in an example, at least one of the first sensor 130 and the second sensor 160 includes a strain gauge 500. In an example, both the first sensor 130 and the second sensor 160 include the strain gauge 500. Use of the strain gauge 500 as at least one of the first sensor 130 and the second sensor 160 provides a small, accurate, and economical means for measuring the bore-dimension BD of the bore 42 by measuring an external force exerted on the plurality of first contact elements 112, 114 and/or the plurality of second contact elements 142, 144, respectively.

Figure 13:
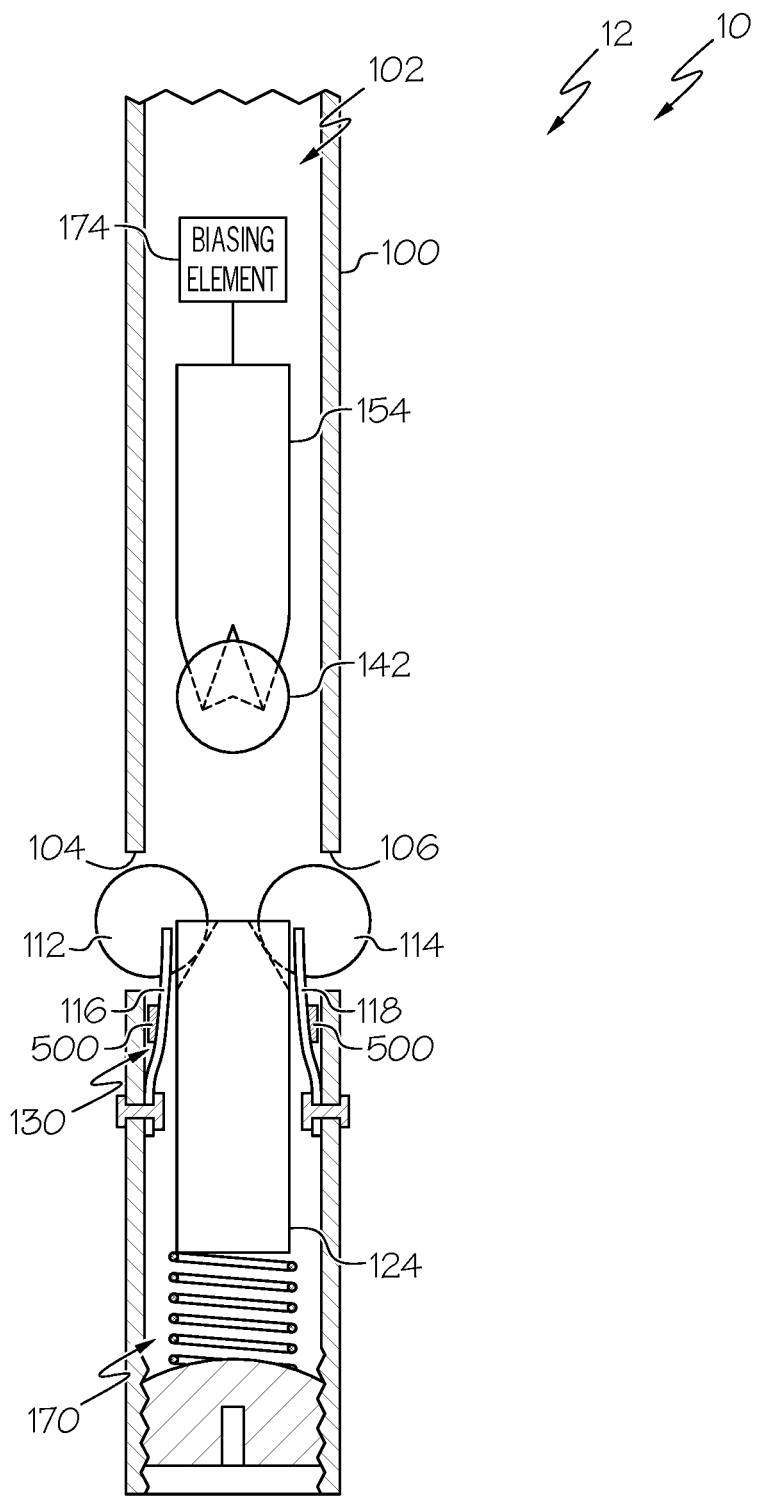
FIG. 13 is an elevational view, in cross-section, of another variation in which the probe portion of the disclosed plug gauge includes a strain sensor in a first arrangement.
Figure 15:
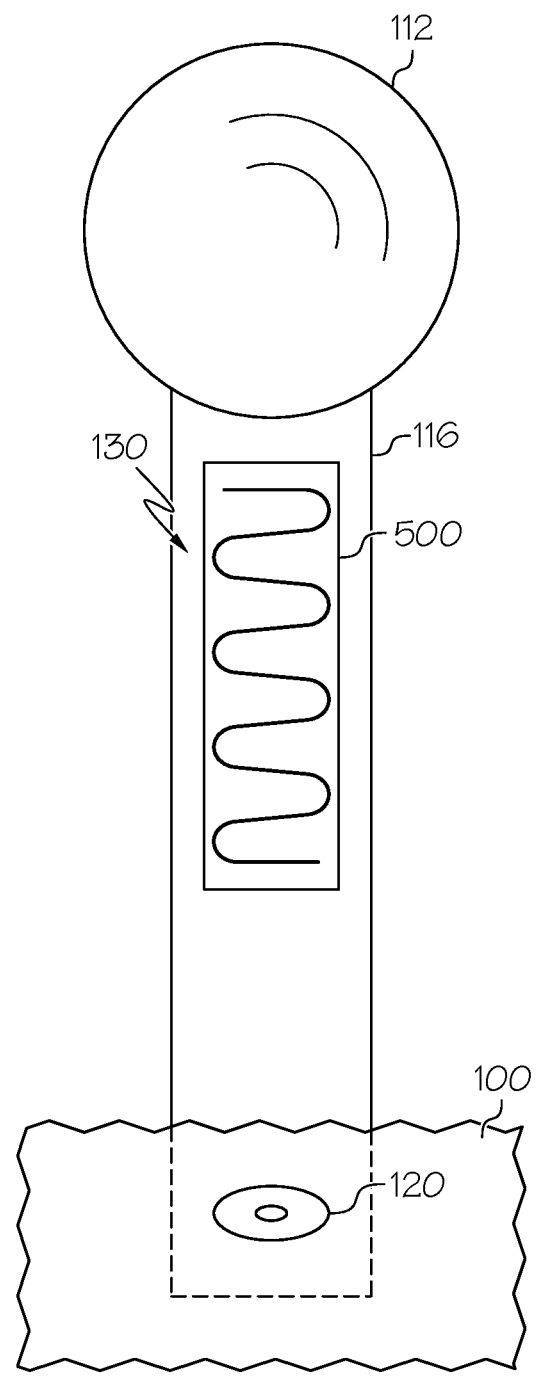
FIG. 15 is an elevational view of a detailed portion of the probe portion shown in FIG. 14.

Referring generally to FIGS. 2-4 and particularly to FIGS. 13 and 15, in an example, each first contact element 112, 114 of the plurality of first contact elements 112, 114 is connected to the housing 100 by the associated retainer 116, 118 of the plurality of retainers 116, 118. As illustrated in FIGS. 13 and 15, in an example, the first sensor 130 includes at least one strain gauge 500 connected to the retainer 116, 118 of the plurality of retainers 116, 118. Use of the strain gauge 500 as the first sensor 130 provides a small, accurate, and economical means for measuring the bore-dimension BD of the bore 42 by measuring deflection in the associated retainer 116, 118 of the plurality of retainers 116, 118.

Although FIG. 15 illustrates an example of the first sensor 130 including the strain gauge 500 connected to the first retainer 116, FIG. 15 is also illustrative of an example of the first sensor 130 including the strain gauge 500 connected to the first retainer 118.

Radially inward movement of the plurality of first contact elements 112, 114 exerts a force on the associated retainer 116, 118 of the plurality of retainers 116, 118. The strain gauge 500 converts the force (e.g., tension) applied to the associated retainer 116, 118 into a change in electrical resistance. The strain gauge 500 measures a resistance differential that varies with the applied force and generates an output signal. The output signal generated by the strain gauge 500 represents the bore-dimension BD of the bore 42 at a given location of the plurality of first contact elements 112, 114 along the longitudinal-central axis of the bore 42.

Figure 14:
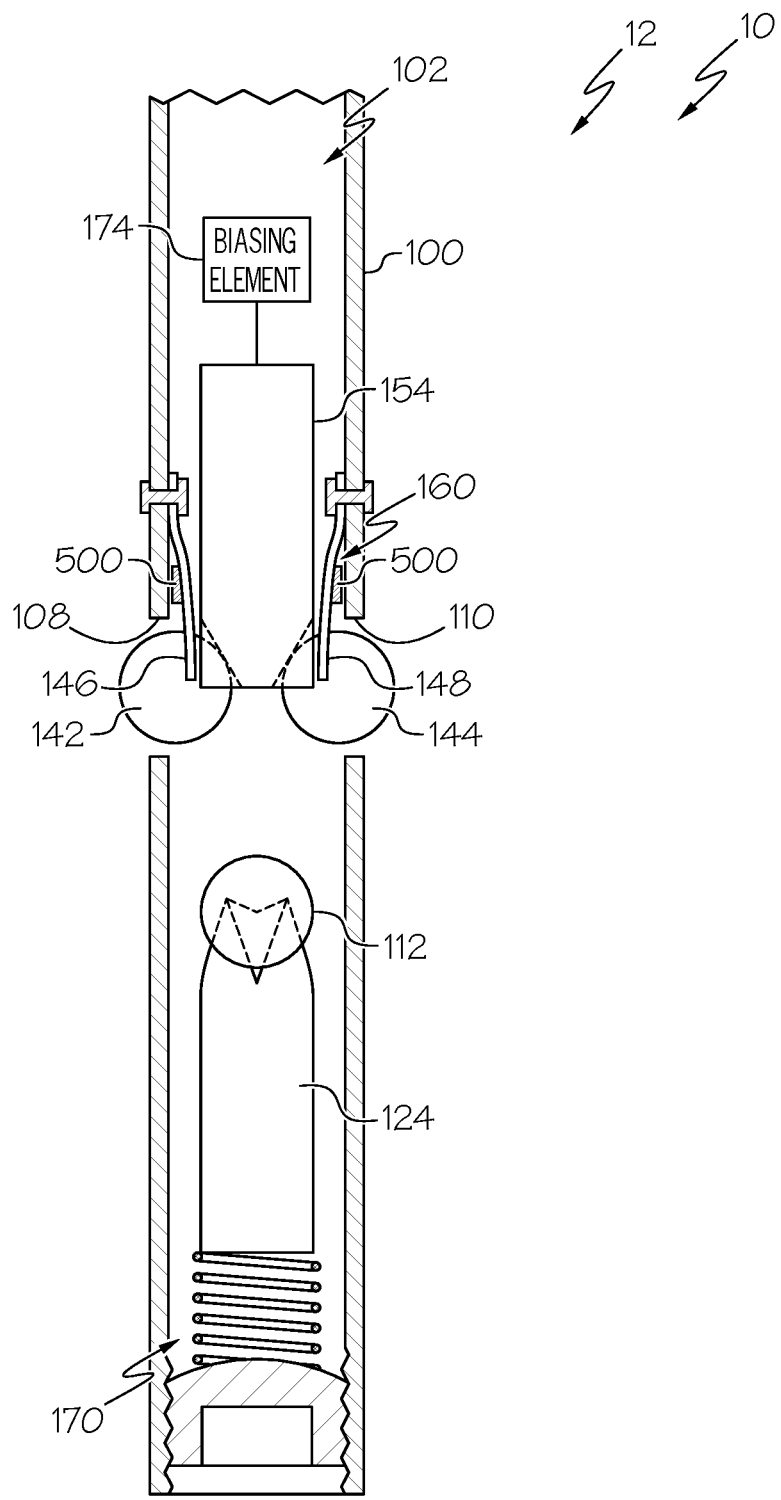
FIG. 14 is an elevational view, in cross-section, of the probe portion of FIG. 13 shown rotated ninety degrees from the orientation shown in FIG. 13.

Referring generally to FIGS. 2-4 and particularly to FIGS. 14 and 15, in an example, each second contact element 142, 144 of the plurality of second contact elements 142, 144 is connected to the housing 100 by the associated retainer 146, 148 of the plurality of retainers 146, 148. As illustrated in FIGS. 14 and 15, in an example, the second sensor 160 includes at least one strain gauge 500 connected to the retainer 146, 148 of the plurality of retainers 146, 148. Use of the strain gauge 500 as the second sensor 160 provides a small, accurate, and economical means for measuring the bore-dimension BD of the bore 42 by measuring deflection in the associated retainer 146, 148 of the plurality of retainers 146, 148.

Although FIG. 15 illustrates an example of the first sensor 130 including the strain gauge 500 connected to the first retainer 116, FIG. 15 is also illustrative of examples of the second sensor 160 including the strain gauge 500 connected to the second retainer 146 and the second sensor 160 including the strain gauge 500 connected to the second retainer 148.

Figure 16:
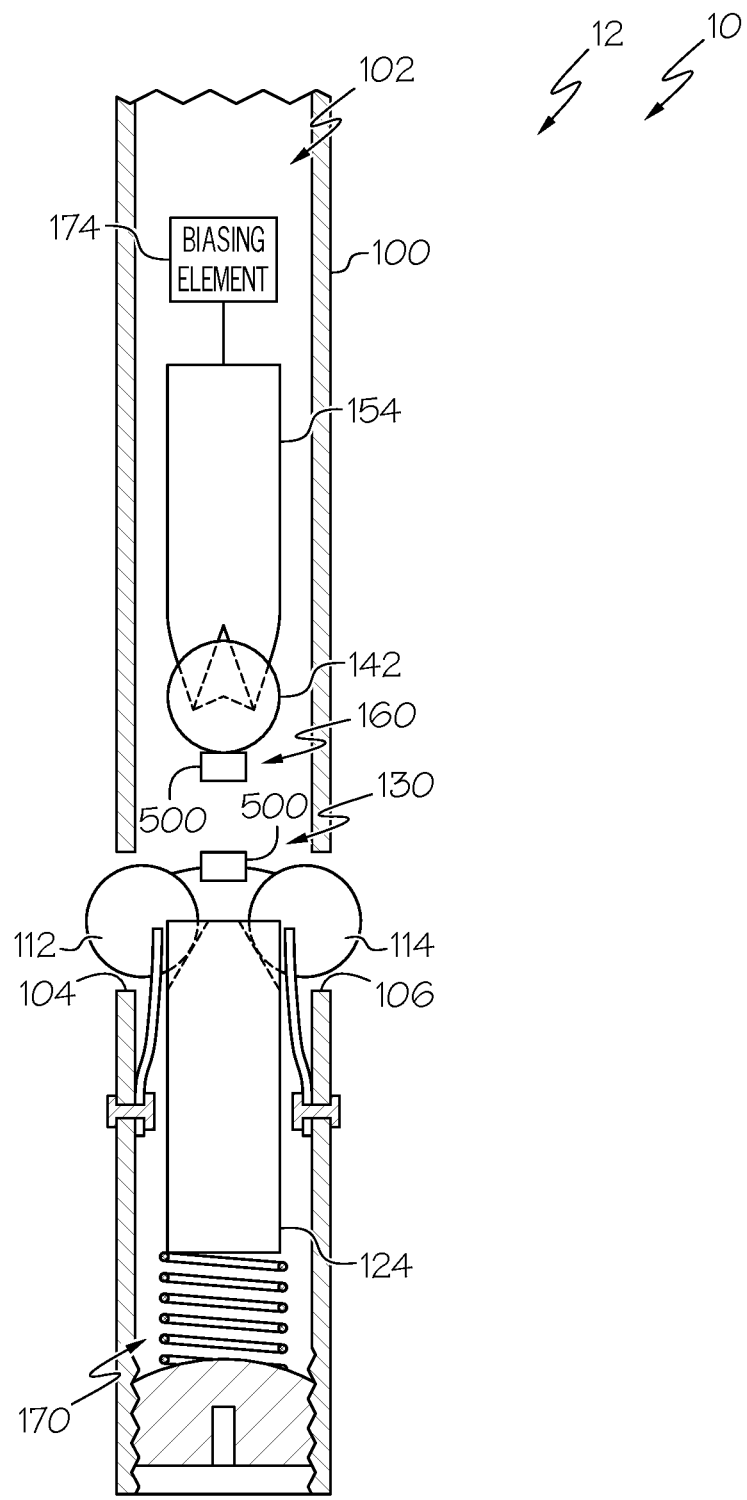
FIG. 16 is an elevational view, in cross-section, of yet another variation in which the probe portion of the disclosed plug gauge includes a strain sensor in a second arrangement.
Figure 17:
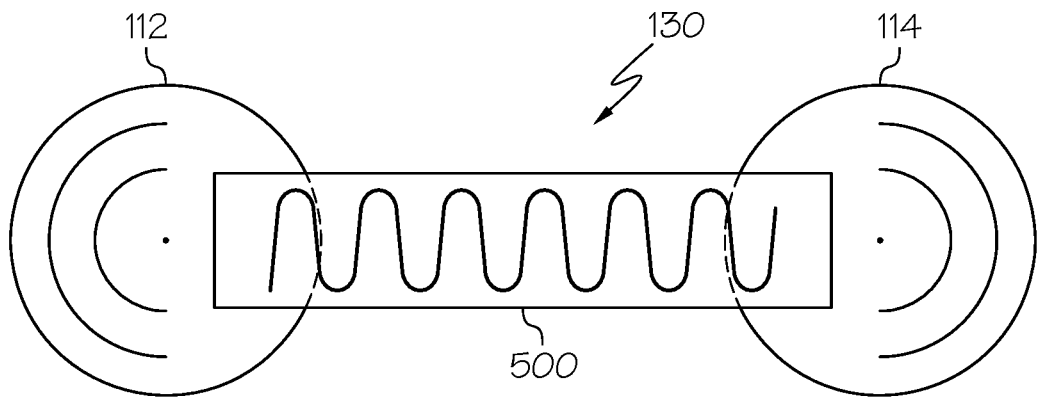
FIG. 17 is an elevational view of a detailed portion of the probe portion shown in FIG. 16.

Referring generally to FIGS. 1-4 and particularly to FIGS. 16 and 17, in an example, the first sensor 130 includes the strain gauge 500 connected to two first contact elements 112, 114 of the plurality of first contact elements 112, 114. Use of the strain gauge 500 as the first sensor 130 provides a small, accurate, and economical means for measuring the bore-dimension BD of the bore 42 by measuring relative displacement of the two first contact elements 112, 114.

Radially inward movement of the two first contact elements 112, 114 exerts a force on strain gauge 500. The strain gauge 500 converts the force (e.g., compression) into a change in electrical resistance. The strain gauge 500 measures a resistance differential that varies with the applied force and generates an output signal. The output signal generated by the strain gauge 500 represents the bore-dimension BD of the bore 42 at a given location of the two first contact elements 112, 114 along the longitudinal-central axis of the bore 42.

Referring generally to FIGS. 1-4 and particularly to FIGS. 16 and 17, in an example, the second sensor 160 includes the strain gauge 500 connected to two second contact elements 142, 144 of the plurality of second contact elements 142, 144. Use of the strain gauge 500 as the second sensor 160 provides a small, accurate, and economical means for measuring the bore-dimension BD of the bore 42 by measuring relative displacement of the two second contact elements 142, 144.

Radially inward movement of the two second contact elements 142, 144 exerts a force on strain gauge 500. The strain gauge 500 converts the force (e.g., compression) into a change in electrical resistance. The strain gauge 500 measures a resistance differential that varies with the applied force and generates an output signal. The output signal generated by the strain gauge 500 represents the bore-dimension BD of the bore 42 at a given location of the two second contact elements 142, 144 along the longitudinal-central axis of the bore 42.

Referring to FIGS. 1-17, in one particular example, the disclosed plug gauge 10 includes the housing 100 defining the internal volume 102 and the longitudinal axis $A_H$. The housing 100 includes a pair of first openings 104, 106 into the internal volume 102 and a pair of second openings 108, 110 into the internal volume 102. The pair of second openings 108, 110 is displaced a pre-defined non-zero distance D along the longitudinal axis $A_H$ from the pair of first openings 104, 106. The plug gauge 10 also includes a pair of first contact elements 112, 114 aligned along the first contact element axis $A_{C1}$ that is generally perpendicular to the longitudinal axis $A_H$. Each first contact element 112, 114 of the pair of first contact elements 112, 114 is received in an associated one of the pair of first openings 104, 106. The plug gauge 10 further includes the first plunger 124 received in the internal volume 102 of the housing 100 and defining the first plunger axis $A_{P1}$ that is aligned with the longitudinal axis $A_H$ of the housing 100. The first plunger 124 is movable relative to the housing 100 along the first plunger axis $A_{P1}$. The first plunger 124 is biased into engagement with the pair of first contact elements 112, 114. The plug gauge 10 additionally includes the first sensor 130 received in the internal volume 102 of the housing 100 to sense movement of the first plunger 124 relative to the housing 100. The plug gauge 10 also includes a pair of second contact elements 142, 144 aligned along the second contact element axis $A_{C2}$ that is generally perpendicular to the longitudinal axis $A_H$ and disposed at a non-zero angle $\Theta$ relative to the first contact element axis $A_{C1}$. Each second contact element 142, 144 of the pair of second contact elements 142, 144 is received in an associated one of the pair of second openings 108, 110. The plug gauge 10 further includes the second plunger 154 received in the internal volume 102 of the housing 100 and defining the second plunger axis $A_{P2}$ that is aligned with the longitudinal axis $A_H$ of the housing 100. The second plunger 154 is movable relative to the housing 100 along the second plunger axis $A_{P2}$. The second plunger 154 is biased into engagement with the pair of second contact elements 142, 144. The plug gauge 10 additionally includes the second sensor 160 sensing movement of the second plunger 154 relative to the housing 100.

Referring to FIGS. 1-4, 6-9, 11-14, and 16, in one or more examples, the second sensor 160 is received in the internal volume 102 of the housing 100. Positioning both the first sensor 130 and the second sensor 160 within the internal volume 102 of the housing 100 provides a compact and enclosed assembly capable of taking multiple simultaneous diametric measurements of the bore 42 formed in the structure 40 (FIG. 1).

Referring generally to FIGS. 1-4 and particularly to FIGS. 6-17, in one or more examples, the first sensor 130 includes at least one of the linear position sensor 200, 300, 400 and the strain gauge 500. In one or more examples, the second sensor 160 includes at least one of the linear position sensor 200, 300, 400 and the strain gauge 500.

Referring to FIG. 1, examples of a system 8 for taking multiple simultaneous diametric measurements of a bore 42 formed in a structure 40 are disclosed. In one or more examples, the system 8 includes the plug gauge 10. The plug gauge 10 is sized to be received in the bore 42. The system 8 also includes the support 20 connected to the plug gauge 10. In an example, the housing 100, the plurality of first contact elements 112, 114, the first plunger 124, the first sensor 130, the plurality of second contact elements 142, 144, the second plunger 154, and the second sensor 160 form the probe portion 12 of the plug gauge 10. The coupling portion 14 is configured to connect the probe portion 12 to the support 20.

Referring to FIG. 1, in an example, the support 20 includes a robotic arm 22. The robotic arm 22 is configured to automatically insert the plug gauge 10 (e.g., the probe portion 12) within the bore 42 for taking multiple simultaneous diametric measurements of the bore 42. In an example, the robotic arm 22 positions the plug gauge 10 within the bore 42 (at a stationary position along the longitudinal-central axis of the bore 42) for taking two simultaneous diametric measurements of the bore-dimension BD of the bore 42 at two measurement locations of the plurality of first contact elements 112, 114 and the plurality of second contact elements 142, 144. In an example, the robotic arm 22 linearly moves the plug gauge 10 through the bore 42 (e.g., along the longitudinal-central axis of the bore 42) for taking a plurality of simultaneous diametric measurements of the bore-dimension BD of the bore 42 along the longitudinal-central axis of the bore 42 as the plurality of first contact elements 112, 114 and the plurality of second contact elements 142, 144 move linearly through the bore 42. In an example, the robotic arm 22 rotationally moves the plug gauge 10 within the bore 42 (e.g., about the longitudinal-central axis of the bore 42) for taking a plurality of simultaneous diametric measurements of the bore-dimension BD of the bore 42 along the circumference of the bore 42 at two measurement locations along the longitudinal-central axis of the bore 42. In an example, the robotic arm 22 linearly moves the plug gauge 10 along the longitudinal-central axis of the bore 42 while also generally simultaneously rotationally moving the plug gauge 10 about the longitudinal-central axis of the bore 42 for taking a plurality of simultaneous diametric measurements of the bore-dimension BD of the bore 42 along both the circumference of the bore 42 and the longitudinal-central axis of the bore 42.

In an example, the robotic arm 22 includes or serves as the second biasing element 174. For example, one end of the housing 100 is open so that, when the plug gauge 10 is coupled to the robotic arm 22, a portion of the robotic arm 22 or a component of the robotic arm 22 is operatively coupled with the second plunger 154 to bias the second plunger 154 into engagement with the plurality of second contact elements 142, 144.

Referring to FIG. 1, in an example, the system 8 includes a computer system 30. The computer system 30 is in communication with the first sensor 130, the second sensor 160, and the robotic arm 22. The computer system 30 is operable to control the robotic arm 22 to automatically position and move the plug gauge 10 relative to the bore 42. The computer system 30 is also operable to analyze and/or display the output signals and/or measurements generated by the first sensor 130 and the second sensor 160 representing the multiple simultaneous diametric measurements of the bore-dimension BD of the bore 42.

Figure 18:
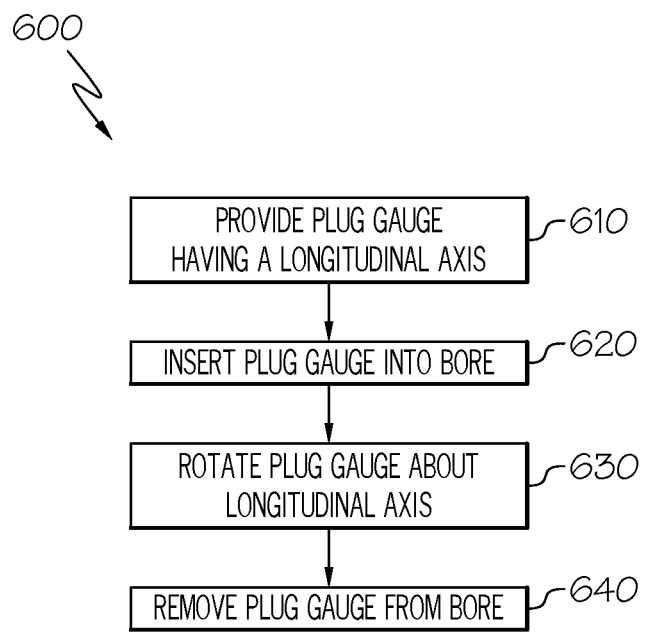
FIG. 18 is a flow diagram depicting one example of the disclosed method for taking multiple simultaneous diametric measurements.

Referring generally to FIGS. 1-17 and particularly to FIG. 18, examples of a method 600 for taking multiple simultaneous diametric measurements of a bore 42 formed in a structure 40 are disclosed. In one or more example, the method 600 includes a step of (block 610) providing the plug gauge 10 having the longitudinal axis $A_H$. For the purpose of the present disclosure, the term "providing," in reference to the step of (block 610) providing the plug gauge 10, means to make available or ready for use and does not imply a requirement to make or otherwise supply.

Referring to FIG. 18, in one or more example, the method 600 includes a step of (block 620) inserting the plug gauge 10 into the bore 42 while the plug gauge 10 is at a first orientation with respect to the longitudinal axis $A_H$. The method 600 also includes a step of (block 630) rotating the plug gauge 10 about the longitudinal axis $A_H$ to a second orientation with respect to the longitudinal axis $A_H$. The method 600 further includes a step of (block 640) withdrawing the plug gauge 10 from the bore 42.

As illustrated in FIGS. 1-5, in an example, with the plug gauge 10 located within the bore 42 and positioned at the first orientation, the plurality of first contact elements 112, 114 engage first diametrically opposed measuring locations on the interior surface defining the bore 42 to take a first bore measurement and the plurality of second contact elements 142, 144 engage second diametrically opposed measuring locations on the interior surface defining the bore 42 to simultaneously take a second bore measurement. As illustrated in FIGS. 2 and 3, in an example, the first bore measurement and the second bore measurement are taken at different locations along the longitudinal-central axis of the bore 42, which are linearly displaced by the displacement distance D. As illustrated in FIG. 5, in an example, the first bore measurement and the second bore measurement are taken at different angular locations about the longitudinal-central axis of the bore 42, which are angularly displaced by the displacement angle Θ.

Following rotation of the plug gauge 10 to the second orientation, the plurality of first contact elements 112, 114 engage third diametrically opposed measuring locations on the interior surface defining the bore 42 to take a third bore measurement and the plurality of second contact elements 142, 144 engage fourth diametrically opposed measuring locations on the interior surface defining the bore 42 to simultaneously take a fourth bore measurement. In an example, the third bore measurement and the fourth bore measurement are taken at different locations along the longitudinal-central axis of the bore 42, which are linearly displaced by the displacement distance D. In an example, the third bore measurement and the fourth bore measurement are taken at different angular locations about the longitudinal-central axis of the bore 42, which are angularly displaced by the displacement angle Θ.

In an example, the method 600 includes a step of linearly moving the plug gauge 10 through the bore 42, along the longitudinal-central axis of the bore 42, while maintaining the plug gauge 10 at one of the first orientation or the second orientation. In an example, the method 600 includes a step of linearly moving the plug gauge 10 through the bore 42, along the longitudinal-central axis of the bore 42, while rotating the plug gauge 10 from the first orientation to the second orientation.

Referring generally to FIGS. 1-17 and particularly to FIG. 18, in one or more example, according to the method 600, the steps of (blocks 620, 630, and 640) inserting, rotating, and withdrawing are performed by the robotic arm 22 controlled by the computer system 30.

In another example, the steps of (blocks 620, 630, and 640) inserting, rotating, and withdrawing are performed manually, for example, by a human operator.

Referring to FIG. 1, in accordance with one or more examples of the plug gauge 10, the system 8, and the method 600, the computer system 30 includes a bus or other communication mechanism for communicating information, and a processor coupled with bus for processing information. The computer system 30 also includes a memory, which may be a random access memory (RAM) or other dynamic storage device, coupled to bus for storing instructions to be executed by processor. The memory may also be used for storing intermediate information during execution of instructions to be executed by processor. The memory may include, for example, flash memory. The memory also includes a read only memory (ROM) or other static storage device coupled to bus for storing static information and instructions for processor. For example, a storage device, such as a magnetic disk or optical disk, may be provided and coupled to bus for storing information and instructions. The computer system 30 additionally includes a display for displaying information to a computer user and an input device for communicating information and command selections to the processor.

The computer system 30 is configured to perform at least some of the operations described herein. Consistent with certain implementations of the disclosed examples, results are provided by the computer system 30 in response to the processor executing one or more sequences of one or more instructions contained in the memory. Such instructions may be read into the memory from another computer-readable medium, such as the storage device. Execution of the sequences of instructions contained in the memory causes the processor to perform the operational steps and/or processes described herein. Alternatively hard-wired circuitry may be used in place of or in combination with software instructions to implement the disclosed examples. Thus implementations of the disclosed examples are not limited to any specific combination of hardware circuitry and software. The term "computer-readable medium" as used herein refers to any media that participates in providing instructions to the processor for execution. Such a medium may take many forms, including but not limited to, non-volatile media, volatile media, and transmission media. Non-volatile media includes, for example, optical or magnetic disks, such as the storage device. Volatile media includes dynamic memory, such as the memory. Transmission media includes coaxial cables, copper wire, and fiber optics, including the wires that form the bus.

Figure 19:
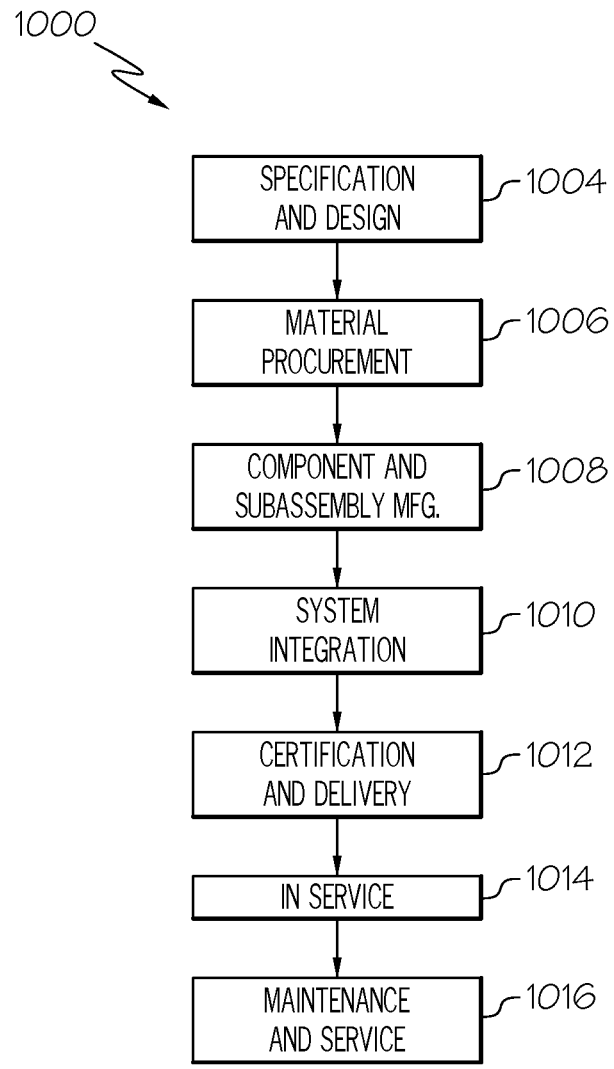
FIG. 19 is a flow diagram of an aircraft manufacturing and service methodology.
Figure 20:
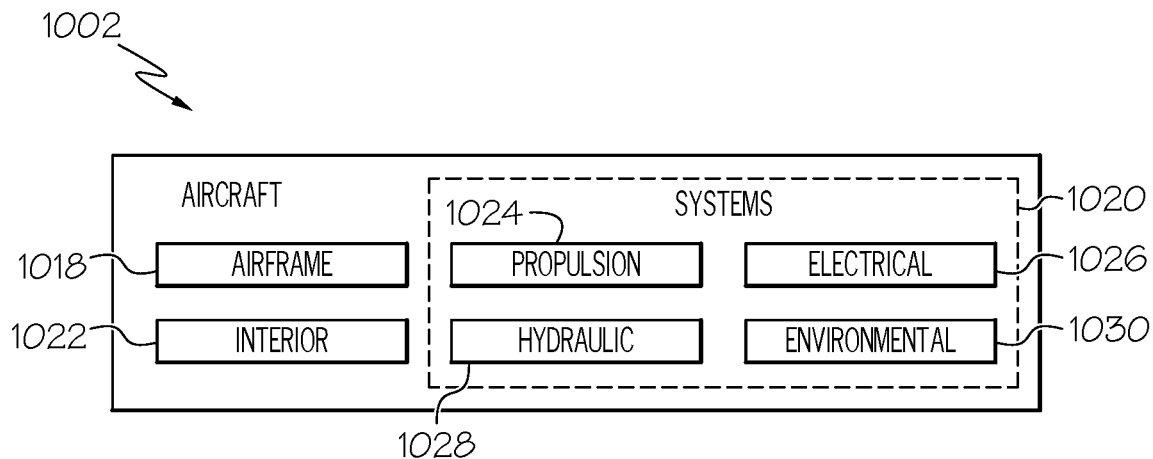
FIG. 20 is a block diagram of an aircraft.

Examples of the plug gauge 10, the system 8, and the method 600 disclosed herein may find use in a variety of potential applications, particularly in the transportation industry, including for example, aerospace applications. Referring now to FIGS. 19 and 20, examples of the plug gauge 10, the system 8, and the method 600 may be used in the context of an aircraft manufacturing and service method 1000, as shown in the flow diagram of FIG. 19 and an aircraft 1002, as shown in FIG. 20. Aircraft applications may include taking multiple simultaneous diametric measurements of a bore formed in a structure or other component used in the manufacture of aircraft using the plug gauge 10, the system 8, and/or the method 600 disclosed herein.

FIG. 20 is an illustrative example of the aircraft 1002. The aircraft 1002 includes an airframe 1018, a plurality of high-level systems 1020, and an interior 1022. Examples of the high-level systems 1020 include one or more of a propulsion system 1024, an electrical system 1026, a hydraulic system 1028, and an environmental system 1030. In other examples, the aircraft 1002 may include any number of other types of systems.

The aircraft 1002 illustrated in FIG. 20 is an example of an aircraft having one or more structures or components that include any number of bores, for example, used for fastening purposes, which may be measured using the plug gauge 10, the system 8, and/or the method 600 disclosed herein. In an example, the structure 40 (FIG. 1) is a component of the aircraft 1002 or is an element of a larger assembly of the aircraft 1002. In an example, the structure 40 forms a part of the airframe 1018 of the aircraft 1002, such as a fuselage, a wing, a vertical stabilizer, a horizontal stabilizer, another structure of the aircraft 1002, such as a skin panel, a stringer, a spar, a rib, a wing box, a stiffener, or a part of the interior 1022, such as an interior panel.

As illustrated in FIG. 19, during pre-production, the method 1000 may include specification and design of aircraft 1002 (block 1004) and material procurement (block 1006). During production of the aircraft 1002, component and subassembly manufacturing (block 1008) and system integration (block 1010) of the aircraft 1002 may take place. Thereafter, the aircraft 1002 may go through certification and delivery (block 1012) to be placed in service (block 1014). Implementation of the plug gauge 10, the system 8, and the method 600 may form a portion of component and subassembly manufacturing (block 1008) and/or system integration (block 1010). Routine maintenance and service (block 1016) may include modification, reconfiguration, refurbishment, etc. of one or more systems of the aircraft 1002.

Each of the processes of the method 1000 illustrated in FIG. 19 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the plug gauge 10, the system 8, and the method 600 shown or described herein may be employed during any one or more of the stages of the manufacturing and service method 1000 shown in the flow diagram illustrated by FIG. 19. For example, components or subassemblies, such as those that include the structure 40 having any number of bores 42, corresponding to component and subassembly manufacturing (block 1008) may be fabricated or manufactured in a manner similar to components or subassemblies produced while the aircraft 1002 (FIG. 20) is in service (block 1014). Also, one or more examples of the plug gauge 10, the system 8, and the method 600 described herein may be utilized during production stages (block 1010 and block 1012). Similarly, one or more examples of the plug gauge 10, the system 8, and the method 600 described herein may be utilized, for example and without limitation, while the aircraft 1002 is in service (block 1014) and during maintenance and service (block 1016).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other vehicle structures (e.g., land vehicles, marine vehicles, space vehicles, etc.) and stand-alone structures.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As used herein, the terms "approximately," "about," and "generally" refer to or represent a condition that is close to, but not exactly, the stated condition that still performs the desired function or achieves the desired result. As an example, the terms "approximately," "about," and "generally" refer to a condition that is within an acceptable predetermined tolerance or accuracy. For example, the terms "approximately," "about," and "generally" refer to a condition that is within 10% of the stated condition. However, the terms "approximately," "about," and "generally" do not exclude a condition that is exactly the stated condition. As used herein, the term "substantially" refers to or represents a condition that is the same as the stated condition to an extent that it may be perceived as being exact. For example, the term "substantially" encompasses conditions that are exactly the same or that are within a predetermined allowable variance, such as within +/−5%, +/−2%, or +/−1%.

Unless otherwise explicitly stated, the schematic illustrations of examples depicted in FIGS. 1-17, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Additionally, those skilled in the art will appreciate that not all elements described and illustrated herein need be included in every example and not all elements described herein are necessarily depicted in each illustrative example.

In FIGS. 18 and 19, referred to above, the blocks may represent operations, steps, and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 18 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the plug gauge 10, the system 8, and the method 600 have been shown and described, modifications may occur to those skilled in the art upon reading the specification. The present application includes such modifications and is limited only by the scope of the claims.

What is claimed is:

1. A plug gauge comprising:
   a housing defining an internal volume and a longitudinal axis, said housing comprising a plurality of first openings into said internal volume and a plurality of second openings into said internal volume;
   a plurality of first contact elements, wherein each first contact element of said plurality of first contact elements is at least partially received in a respective one of said plurality of first openings in said housing;
   a first plunger received in said internal volume of said housing and defining a first plunger axis that is aligned with said longitudinal axis of said housing, said first plunger being movable relative to said housing along said first plunger axis, wherein said first plunger is biased into engagement with said plurality of first contact elements to urge said plurality of first contact elements radially outward through said plurality of first openings;
   a first sensor sensing movement of said first plunger relative to said housing;
   a plurality of second contact elements, wherein each second contact element of said plurality of second contact elements is at least partially received in a respective one of said plurality of second openings in said housing;
   a second plunger received in said internal volume of said housing and defining a second plunger axis that is aligned with said longitudinal axis of said housing, said second plunger being movable relative to said housing along said second plunger axis, wherein said second plunger is biased into engagement with said plurality of second contact elements to urge said plurality of second contact elements radially outward through said plurality of second openings; and
   a second sensor sensing movement of said second plunger relative to said housing.

2. The plug gauge of claim 1 wherein said plurality of second openings are displaced a pre-defined non-zero distance along said longitudinal axis from said plurality of first openings.

3. The plug gauge of claim 1 wherein said plurality of second openings are displaced a non-zero angle Θ about said longitudinal axis relative to said plurality of first openings.

4. The plug gauge of claim 3 wherein said non-zero angle is about 90 degrees.

5. The plug gauge of claim 1 wherein said housing defines an outer surface, and wherein portions of said plurality of first contact elements and portions of said plurality of second contact elements protrude radially outward beyond said outer surface.

6. The plug gauge of claim 1 wherein said plurality of first contact elements consists of two first contact elements aligned along a first contact element axis that is generally perpendicular to said longitudinal axis.

7. The plug gauge of claim 6 wherein said plurality of second contact elements consists of two second contact elements aligned along a second contact element axis that is generally perpendicular to said longitudinal axis, and wherein said second contact element axis is disposed at a non-zero angle relative to said first contact element axis.

8. The plug gauge of claim 1 wherein each first contact element of said plurality of first contact elements is substantially spherical.

9. The plug gauge of claim 1 further comprising a first biasing element positioned to bias said first plunger into engagement with said plurality of first contact elements.

10. The plug gauge of claim 9 further comprising a second biasing element positioned to bias said second plunger into engagement with said plurality of second contact elements.

11. The plug gauge of claim 1 wherein at least one of said first sensor and said second sensor is positioned in said internal volume of said housing.

12. The plug gauge of claim 1 wherein at least one of said first sensor and said second sensor comprises a linear position sensor.

13. The plug gauge of claim 1 wherein said first sensor comprises a linear potentiometer.

14. The plug gauge of claim 13 wherein said linear potentiometer comprises:
   a resistive element connected to one of said housing and said first plunger; and
   a wiper operatively engaged with said resistive element, said wiper being connected to another one of said housing and said first plunger.

15. The plug gauge of claim 1 wherein said first sensor comprises a linear variable differential transformer.

16. The plug gauge of claim 15 wherein said linear variable differential transformer comprises:
   a first secondary coil and a second secondary coil, both positioned in said housing and received over said first plunger; and
   a primary coil positioned in said housing and received over said first plunger, wherein said primary coil is disposed between said first secondary coil and said second secondary coil along said first plunger axis.

17. The plug gauge of claim 16 wherein said first plunger comprises a ferromagnetic material.

18. The plug gauge of claim 1 wherein said first sensor comprises a linear encoder.

19. The plug gauge of claim 1 wherein said first sensor comprises an optical linear encoder comprising:
   a scale on said first plunger;
   a light source positioned in said internal volume of said housing to illuminate at least a portion of said scale; and
   a light detector positioned in said internal volume of said housing to receive light reflected from said scale.

20. The plug gauge of claim 1 wherein at least one of said first sensor and said second sensor comprises a strain gauge.

21. The plug gauge of claim 1 further comprising a plurality of retainers, wherein each first contact element of said plurality of first contact elements is connected to said housing by an associated retainer of said plurality of retainers.

22. The plug gauge of claim 21 wherein said first sensor comprises at least one strain gauge connected to a retainer of said plurality of retainers.

23. A system for taking multiple simultaneous diametric measurements of a bore formed in a structure, said system comprising:
   said plug gauge of claim 1 sized to be received in said bore; and
   a support connected to said plug gauge.

24. The system of claim 23 wherein said support comprises a robotic arm.

25. The system of claim 24 further comprising a computer system in communication with said first sensor, said second sensor and said robotic arm.

26. A method for taking multiple simultaneous diametric measurements of a bore formed in a structure, said method comprising:
   inserting said plug gauge of claim 1 into said bore while said plug gauge is at a first orientation with respect to said longitudinal axis;
   rotating said plug gauge about said longitudinal axis to a second orientation with respect to said longitudinal axis; and
   withdrawing said plug gauge from said bore.

27. A plug gauge comprising:
   a housing defining an internal volume and a longitudinal axis, said housing comprising a pair of first openings into said internal volume and a pair of second openings into said internal volume, wherein said pair of second openings are displaced a pre-defined non-zero distance along said longitudinal axis from said pair of first openings;
   a pair of first contact elements aligned along a first contact element axis that is generally perpendicular to said longitudinal axis, each first contact element of said pair of first contact elements being received in an associated one of said pair of first openings;
   a first plunger received in said internal volume of said housing and defining a first plunger axis that is aligned with said longitudinal axis of said housing, said first plunger being movable relative to said housing along said first plunger axis, wherein said first plunger is biased into engagement with said pair of first contact elements;
   a first sensor received in said internal volume of said housing to sense movement of said first plunger relative to said housing;
   a pair of second contact elements aligned along a second contact element axis that is generally perpendicular to said longitudinal axis and disposed at a non-zero angle relative to said first contact element axis, each second contact element of said pair of second contact elements being received in an associated one of said pair of second openings;
   a second plunger received in said internal volume of said housing and defining a second plunger axis that is aligned with said longitudinal axis of said housing, said second plunger being movable relative to said housing along said second plunger axis, wherein said second plunger is biased into engagement with said pair of second contact elements; and
   a second sensor sensing movement of said second plunger relative to said housing.

28. The plug gauge of claim 27 wherein said second sensor is received in said internal volume of said housing.

29. The plug gauge of claim 27 wherein said first sensor comprises at least one of a linear position sensor and a strain gauge.

30. The plug gauge of claim 29 wherein said second sensor comprises at least one of a linear position sensor and a strain gauge.

* * * * *